April 17, 1962 F. W. LEHAN ET AL 3,030,614

TELEMETRY SYSTEM

Filed Sept. 3, 1959 11 Sheets-Sheet 1

FRANK W. LEHAN
RAY W. SANDERS
ALVIN W. NEWBERRY
INVENTORS

BY Allen E. Botney

ATTORNEY

FRANK W. LEHAN
RAY W. SANDERS
ALVIN W. NEWBERRY
INVENTORS
BY Allen E. Botney
ATTORNEY

FRANK W. LEHAN
RAY W. SANDERS
ALVIN W. NEWBERRY
INVENTORS

BY Allen E. Botney
ATTORNEY

FRANK W. LEHAN
RAY W. SANDERS
ALVIN W. NEWBERRY
INVENTORS
BY Allen E. Botney
ATTORNEY April 17, 1962 F. W. LEHAN ET AL 3,030,614

TELEMETRY SYSTEM

Filed Sept. 3, 1959 11 Sheets-Sheet 5

FRANK W. LEHAN
RAY W. SANDERS
ALVIN W. NEWBERRY
INVENTORS

BY Allen E. Botney

ATTORNEY

April 17, 1962 F. W. LEHAN ET AL 3,030,614

TELEMETRY SYSTEM

Filed Sept. 3, 1959 11 Sheets-Sheet 6

FRANK W. LEHAN
RAY W. SANDERS
ALVIN W. NEWBERRY
INVENTORS

BY Allen E. Botney

ATTORNEY

FRANK W. LEHAN
RAY W. SANDERS
ALVIN W. NEWBERRY
INVENTORS

BY Allen E. Botney
ATTORNEY

FRANK W. LEHAN
RAY W. SANDERS
ALVIN W. NEWBERRY
INVENTORS

BY Allen E. Botney
ATTORNEY

FRANK W. LEHAN
RAY W. SANDERS
ALVIN W. NEWBERRY
INVENTORS

BY Allen E. Botney

ATTORNEY

April 17, 1962 F. W. LEHAN ET AL 3,030,614

TELEMETRY SYSTEM

Filed Sept. 3, 1959 11 Sheets-Sheet 10

FRANK W. LEHAN
RAY W. SANDERS
ALVIN W. NEWBERRY
INVENTORS

BY Allen E. Botney

ATTORNEY

FRANK W. LEHAN
RAY W. SANDERS
ALVIN W. NEWBERRY
INVENTORS
BY Allen Z. Botney
ATTORNEY

3,030,614
TELEMETRY SYSTEM

Frank W. Lehan, Glendale, Ray W. Sanders, Los Angeles, and Alvin W. Newberry, Glendale, Calif., assignors, by mesne assignments, to Space-General Corporation, Glendale, Calif., a corporation of California
Filed Sept. 3, 1959, Ser. No. 837,956
25 Claims. (Cl. 340—204)

Figure 1A:
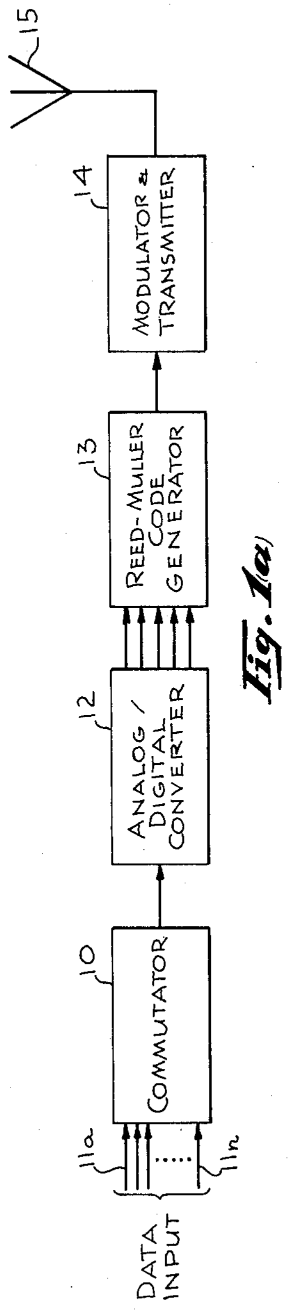

The present invention relates in general to the radio telemetry art and more particularly to a digitalized telemetry system which, in accordance with information theory, approaches the maximum possible communication efficiency.

In the exploration of space, the telemetry system provides the eyes and the ears for the scientist and, therefore, largely determines the success of such exploratory missions. Consequently, the extension of space operations to the limits of the solar system or beyond is likely to be more dependent on advancements which can be made in communications and telemetry than on any other factor.

The rapid developments of the past few years in missile and space technology have produced extended and new telemetry system requirements which must be met if present and future explorations in space are to be fruitful. Thus, one of the outstanding differences between the requirements for telemetry systems in the past and those of the present and future results from the enormous increase in ranges over which effective and reliable transmission must be provided. Rather than the hundreds or thousands of miles involved in earth's-surface telemetry applications, or the several hundred thousand miles for a lunar probe, ranges of $10^7$ to $10^9$ miles may be expected to become typical and explorations at these vast distances from the earth can only be of value if information or data can be radioed back.

In addition to the problem of extending the range of telemetry systems to meet present and future needs, it has also long been considered desirable in telemetry design to make a system as sophisticated or "intelligent" as possible consistent with weight and space requirements. Ideally, a system of this sort would be able to choose only pertinent information and transmit it at selected times, thus saving considerably in bandwidth and power. One step toward providing a more intelligent telemetry system is to incorporate in it both variable accuracy and variable data rate features.

With respect to variable accuracy, it is very inefficient to transmit information with precision beyond the meaning of the data. Required data accuracies will differ for various functions measured, for measurements of the same function on different missions, or measurements of a single function at different times during a single mission. It would be wasteful, for instance, to transmit continuous precise data when simple presence-absence or events per-unit-time information would be sufficient. A shortcoming of present systems is the limited and essentially fixed accuracy which is obtainable from them. Currently employed systems, for example, typically provide an accuracy of approximately two percent. This accuracy can be varied a small amount but only with considerable difficulty and generally at significant expense to other parts and features of the system. The fact that present systems allow very little growth potential in providing variable accuracy is a serious disadvantage of existing telemeters.

As for variable data rate, it primarily offers power economy. An example would be a system alternately turned on and off. When on, the data rate is some nominal maximum; when off, the rate is zero. By controlling the on-off time, the effective data rate can be varied over a wide range. If the meaningful data is properly encoded and stored, a worthwhile saving in power can be realized. However, above and beyond the saving of power, there is a further advantage or benefit to be derived by being able to vary the data rate since a reduction in data rate is accompanied by a corresponding reduction in system bandwidth. Accordingly, by being able to change the data rate and, thereby, the operating bandwidth, a practical method is provided for closely matching system operating conditions to actual signal level requirements as range changes, which is to say that it becomes possible to exchange data rate for accuracy within the system to match a specific mission requirement which, in turn, makes possible an operating link at distances otherwise impossible. Existing systems can accommodate different data rates but have little flexibility in this respect, providing no capability for exchanging data rate for accuracy when varying requirements make it desirable for this to be done.

Considering present day telemetry systems still further, another limitation of them is that they are generally analog systems which are objectionable for a number of reasons. One reason for objection, for example, is that in analog systems noise can vary the information modulation to cause errors in the received data. Digital systems, on the other hand, are inherently accurate in that, once above threshold, the output signal-to-noise ratio is independent of the carrier signal-to-noise. It is essentially true, therefore, that if any information is received at all, it is correct information. Digital modulation also offers other advantages over analog modulation—in speed and capability, bandwidth, and relative signal power required, as may be seen from a comparison of some of these parameters made by L. C. Watson and M. Goldstein in a paper presented by them at the 1959 National Telemetering Conference.

Finally, it may be said that relatively little detailed consideration has been given in the past to the differing communication efficiencies of various telemetry systems or to the benefits which may be derived by utilizing a more nearly optimum system. A number of different types of telemetry systems have been developed and employed in recent years. However, changing requirements have repeatedly necessitated new developments and frequently rendered previously employed techniques and equipment obsolete. In selecting or developing a system for a particular application, the differences in communication efficiency of various systems have not been fully exploited. In other words, the majority of currently used telemetry systems have fairly high values of $\beta$, where $\beta$ is a figure of merit used to compare the efficiencies of communication systems and is defined as the ratio of the minimum received power required to the product of gaussian noise spectral density and information rate. It will be recognized by those skilled in the art, that a prime goal in system design should be attainment of a value of $\beta$ as near to the ideal minimum value of $\log_e 2$ as practical. Since more efficient systems are both theoretically and practically realizable, the high value of $\beta$ is a shortcoming of present systems which can and should be overcome.

It is, therefore, an object of the present invention to provide a telemetry system that reliably transmits information over greatly increased ranges.

It is another object of the present invention to provide a telemetry system that can transmit information with variable accuracy.

It is a further object of the present invention to provide a telemetry system that can transmit data at a variable rate.

It is an additional object of the present invention to provide a telemetry system wherein the accuracy with which data is transmitted may be exchanged with the rate at which it is transmitted.

It is still another object of the present invention to provide a telemetry system that converts analog information to digital form for transmittal.

It is another and further object of the present invention to provide a telemetry system having a variable transmission bandwidth.

It is another additional object of the present invention to provide a telemetry system of relatively good communication efficiency approaching the theoretical limit of communication efficiency.

It is the final object of the present invention to provide a telemetry system whose airborne mechanization is of relatively small weight and size.

The present invention achieves the above-stated objects and thereby substantially eliminates many of the prime disadvantages and limitations of prior telemetry systems by providing a telemetry system that transmits analog information in digital form and at very good communications efficiency, the system being able, furthermore, to transmit this digitalized data at a variable rate or with variable accuracy. With such features, the telemetry system of the present invention presents the opportunity to exchange accuracy for data rate, the ability to make such exchanges, either prior to or during actual flight, while maintaining a constant and near optimum value of $\beta$ being of decided advantage in that power would be conserved and information could be transmitted over longer distances. In short, the system of the present invention provides good performance and versatility in all these areas.

More particularly, the system herein is a generalized pulse code (PCM) system and, therefore, a time-division multiplex system. Morever, the system uses an "orthogonal" set of Reed-Muller pulse codes which are discussed in detail in a paper published by Irvin S. Reed in the September 1954 issue of the Transactions of the I.R.E., PGIT–54, the paper being entitled "A Class of Multiple-Error-Correcting and the Decoding Scheme."

Operation basically consists of sampling an input data source, quantizing the data sample, transmitting a Reed-Muller coded representation of the quantized data sample, receiving and decoding the data, and either storing or displaying a measure of the information received. In an orthogonal system, each message must be recognized by its own matched filter. The matched filter decoder is, therefore, the heart of the system and its operation must be understood if the operation of the complete system is to be understood.

The principal element in the matched filter decoder is a multiple-tapped delay line, preferably but not necessarily a magnetostriction delay line, which provides a means of storing many bits of information received in time sequence, yet allows continuous nondestructive readout of information stored on the line so that a succession of events or a succession of bits of information can be simultaneously compared, that is, it allows data received in time sequence to be linearly summed and differenced according to patterns set into a decoding matrix. The delay-line element, therefore, provides a convenient means of correlating events that may be separated in time by intervals up to several milliseconds or more.

With respect to the decoding matrix, a single resistor or summing matrix associated with a set of systematically located taps on the magnetostrictive delay line can "recognize" a discrete pattern of pulses or otherwise coded information bits simultaneously occurring at these taps. Moreover, a large number of such summing matrices properly "matched" with coded messages can recognize a large number of multiple-digit code transmissions. Hence, the magnetostriction delay-line-decoding matrix combination is very versatile and leads to variable data rate because if the pulse code transmission is "slowed down," this simply means adjusting the delay line taps to be farther apart. It also provides an extremely important characteristic common to most correlation detection systems—that of summing systematic events while tending to cancel random events. This last effect is obviously of primary significance because a cancellation or decrease of random noise means a lower system threshold and, consequently, a greater communication range with a given amount of transmitter power.

The best detector to use with a matched filter decoder is one that simultaneously compares all outputs and determines which filter output is greatest. This approach has been mechanized in the system of the present invention by connecting each filter output to a transistor operated in the emitter-follower configuration with all emitters tied to one common resistor. The transistor realizing the "greatest" signal at its input is turned on, developing a voltage across the common resistor which in turn causes all other transistors to be back-biased with resultant low conduction on all but the one "greatest-of" output bus.

After detection, the information can be directed to a conventional decommutator and analog display system, or it can be identified and stored as quantized information on magnetic tape in a format compatible with a digital computer.

In encoding the quantized data sample, the function of the encoder is simply to determine which of the codes from the set representing all possible data values best represents the value of a data sample—and to cause this particular code group to be transmitted. The particular code chosen for use with the present system is a "maximum redundancy Reed-Muller" group which, for this system, consists of 32 different codes, each 16 digits long.

This code set has orthogonal properties and can be formed by systematically summing the outputs of a binary scaler. Quantization to 32 levels is accomplished by an analog-to-digital converter which establishes a discrete set of commands controlling the generation of the code corresponding to the level established in the quantization process.

The 32-level quantization implies that each data sample contains five bits of information and that this information can be encoded in a 5-digit binary code. A simple binary code, however, does not possess orthogonal characteristics. The 16-digit code can be detected at a lower signal threshold than could the 5-digit code, even though both might be allotted equal transmission energy and the 16-digit code would require 16/5 the bandwidth of the 5-digit code. This is an example of increased efficiency resulting from bandwidth expansion techniques.

A timing and data rate control system, consisting of a crystal oscillator and a binary scaler of several stages, allows the timing system to be "slowed down" by factors of two simply by positioning one switch. The analog-to-digital converter uses a "stairstep" voltage generator and a comparator amplifier.

In operation, the timing system steps a 5-stage binary scaler through 32 possible states while a stairstep voltage is being generated. When the comparator amplifier indicates that the stairstep voltage first exceeds a data sample, an inhibit signal stops the scaler, storing a binary measure of the data sample. The specific on-or-off state of the stages of the binary scaler is used as command information to simple digital logic in the form of AND gates and EXCLUSIVE OR circuitry to generate the one desired of the 32 possible codes, which can be formed by the binary addition of outputs from binary scaler stages.

In operation, the system uses two storage registers in the analog-to-digital conversion system; one controls the code generator to transmit a code representing a data sample quantized in the preceding period while the second register is in process of storing a new quantized value. At the end of each word, simple logic reverses the function of the two storage registers. This approach results in nearly a 100% duty cycle of transmitted information.

System operation depends, of course, on proper synchronization of the decoder with the airborne encoder. This is accomplished by a special code transmitted at systematic intervals, recognized by its matched filter and detector during a short period surrounding the match interval for each code transmitted.

In addition to the various beneficial features provided by the system of the present invention, as previously mentioned, another of its features is that it lends itself particularly well to simple transistorized circuitry and extremely low operating power requirements. Accordingly, the system is physically small and of light weight.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1B:
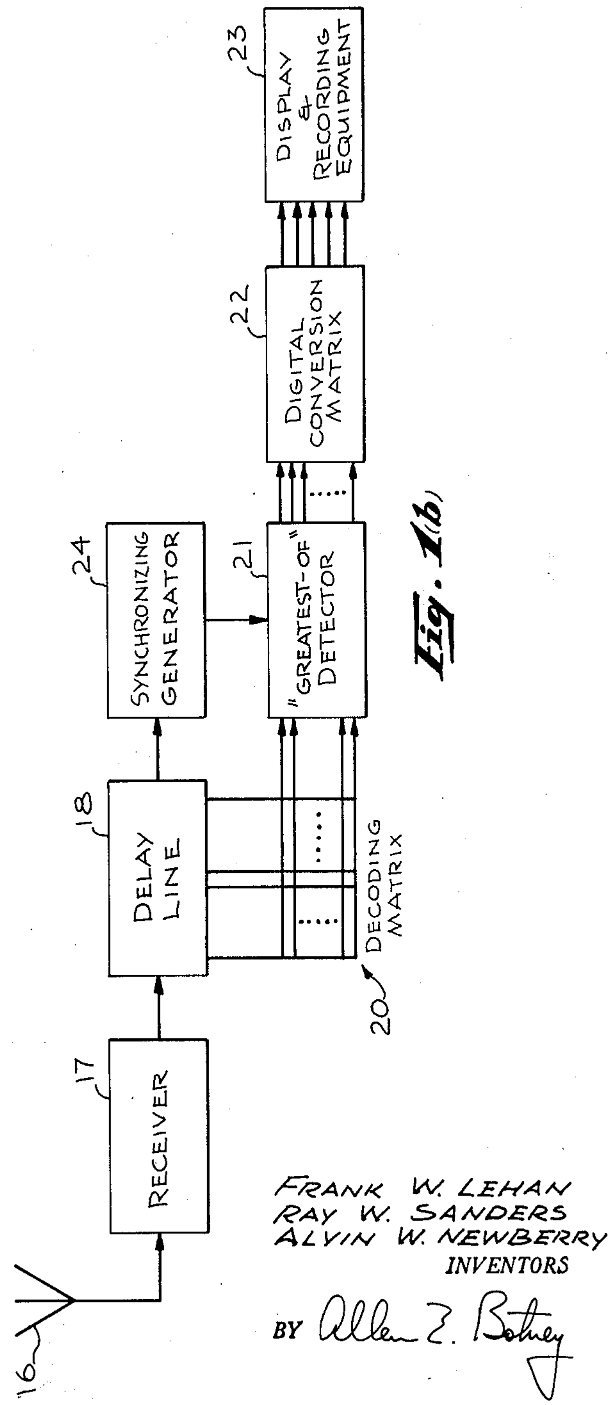
Figure 2A:
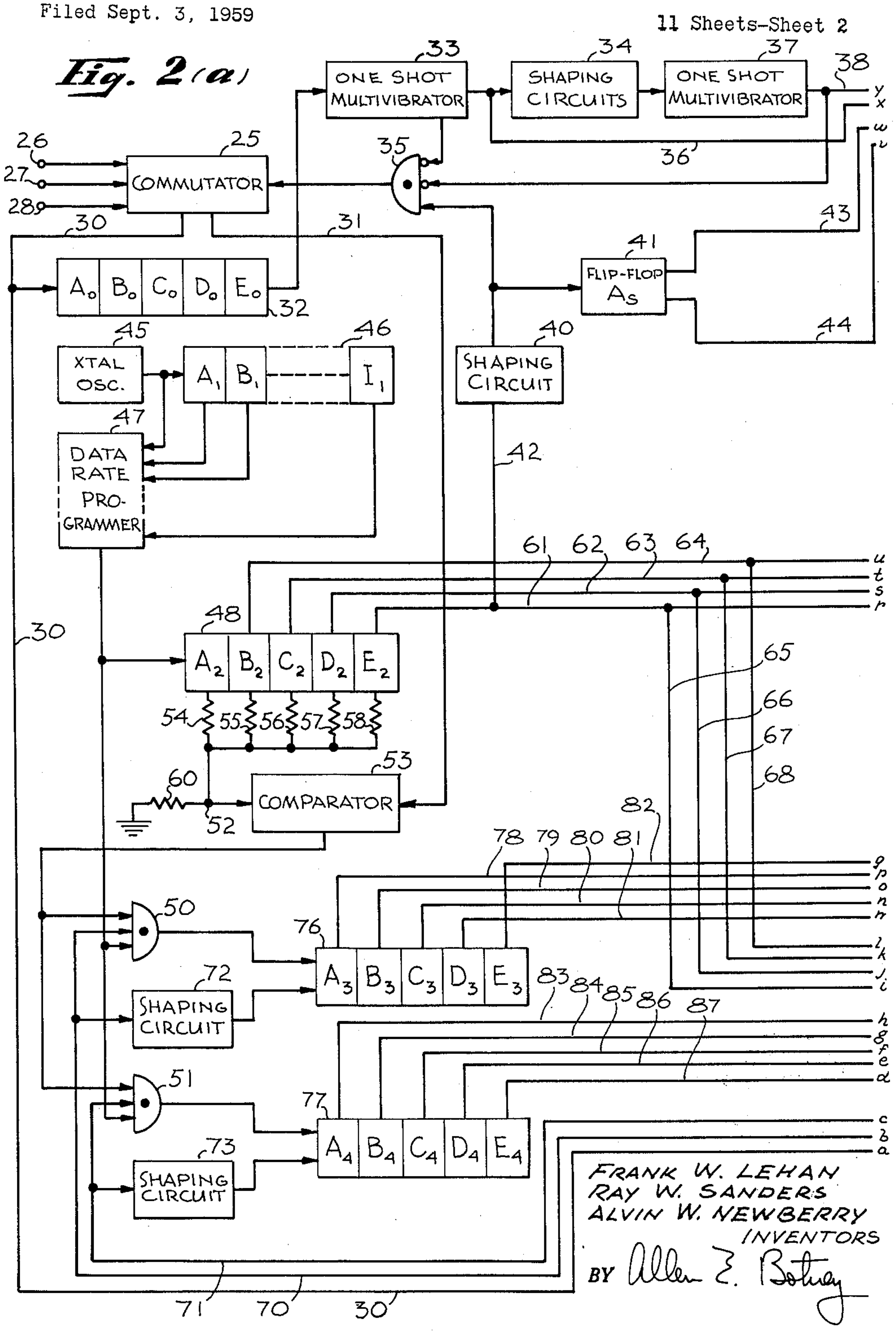
Figure 2B:
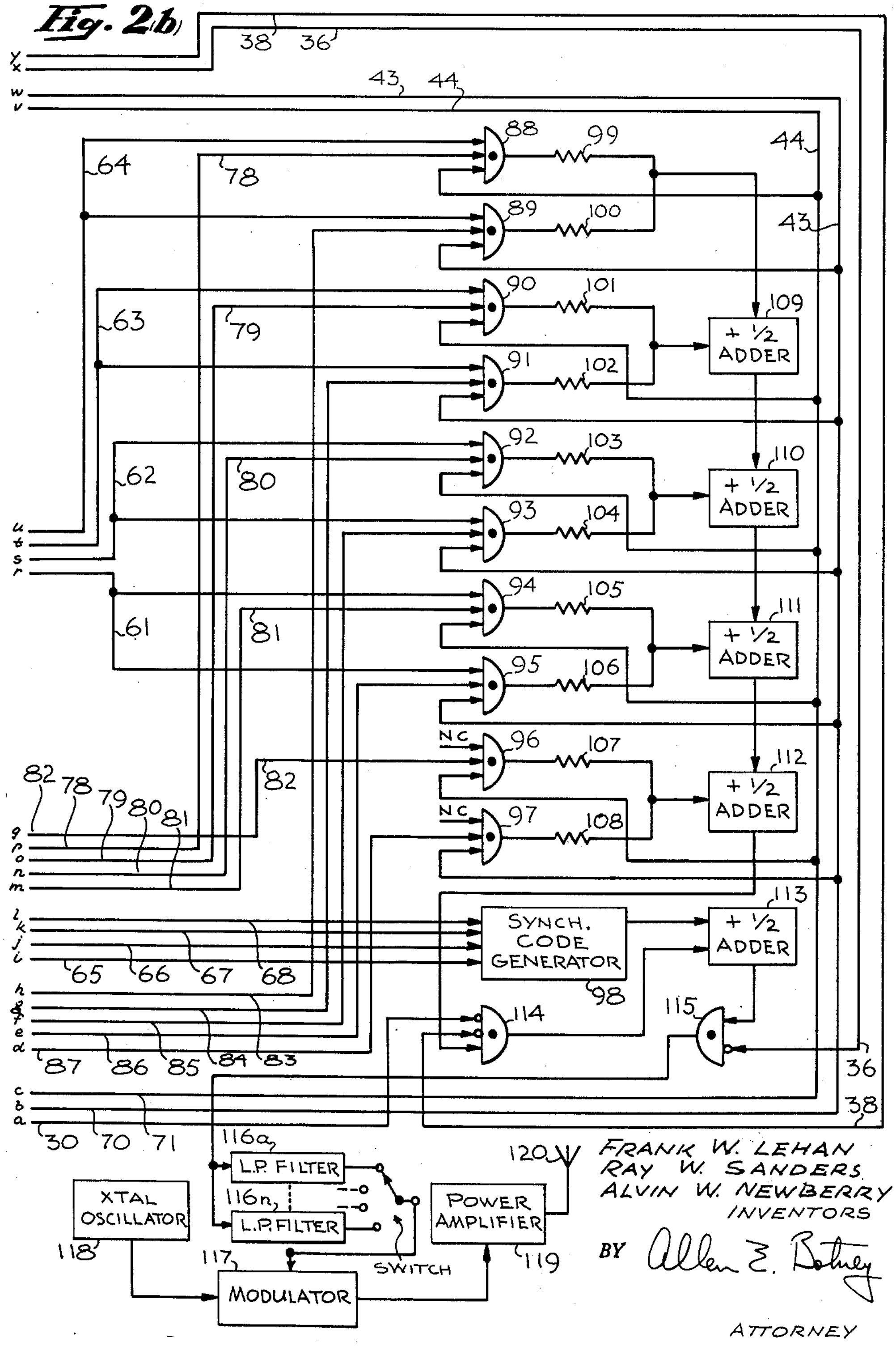
Figure 3A:
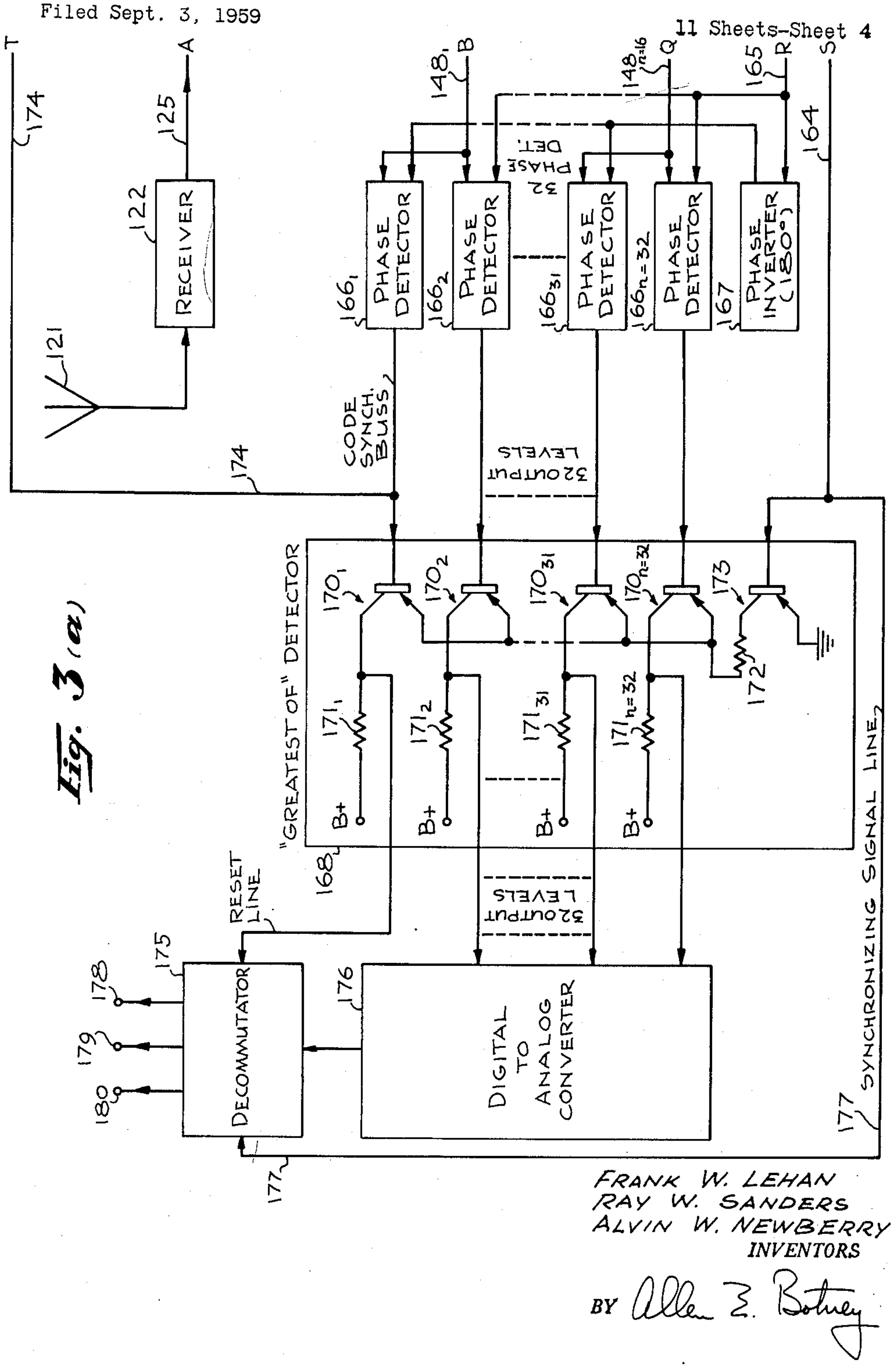
Figure 3B:
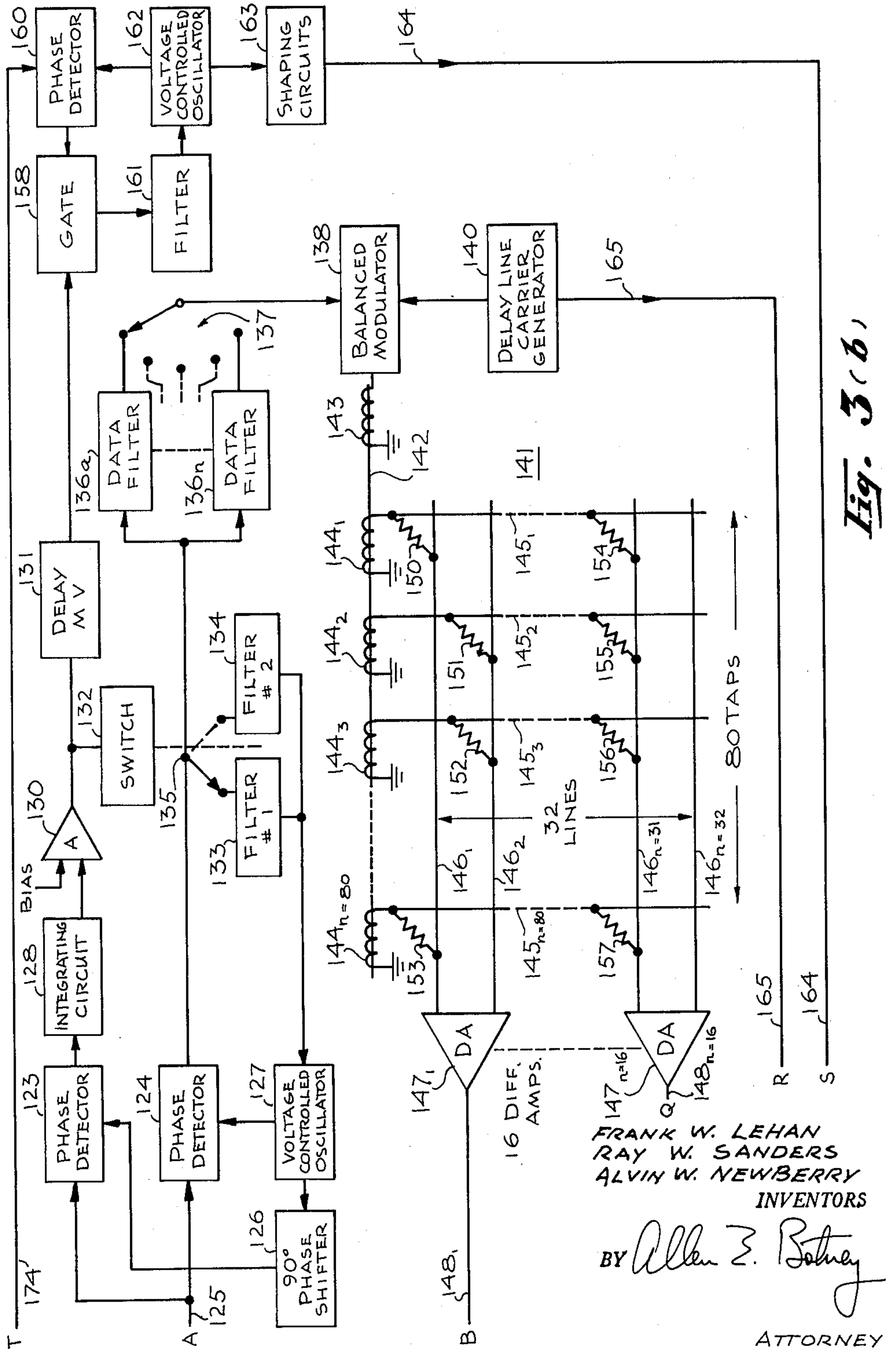

FIGURES 1*a* and 1*b* are over-all block diagrams of the airborne and ground systems, respectively, of a telemetry system according to the present invention;

FIGURES 2*a* and 2*b* illustrate in more detailed block diagram form the airborne system of FIG. 1*a*;

FIGURES 3*a* and 3*b* illustrate in more detailed block diagram form the ground system of FIG. 1*b*; and FIGURES 4*a* to 4*e*, 5*a*, 5*b*, 5'*b* and 6 illustrate transmission sequences and voltage waveforms that may exist at various points in the systems of FIGS. 2*a*, 2*b* and 3*a*, 3*b*.

Figure 7:
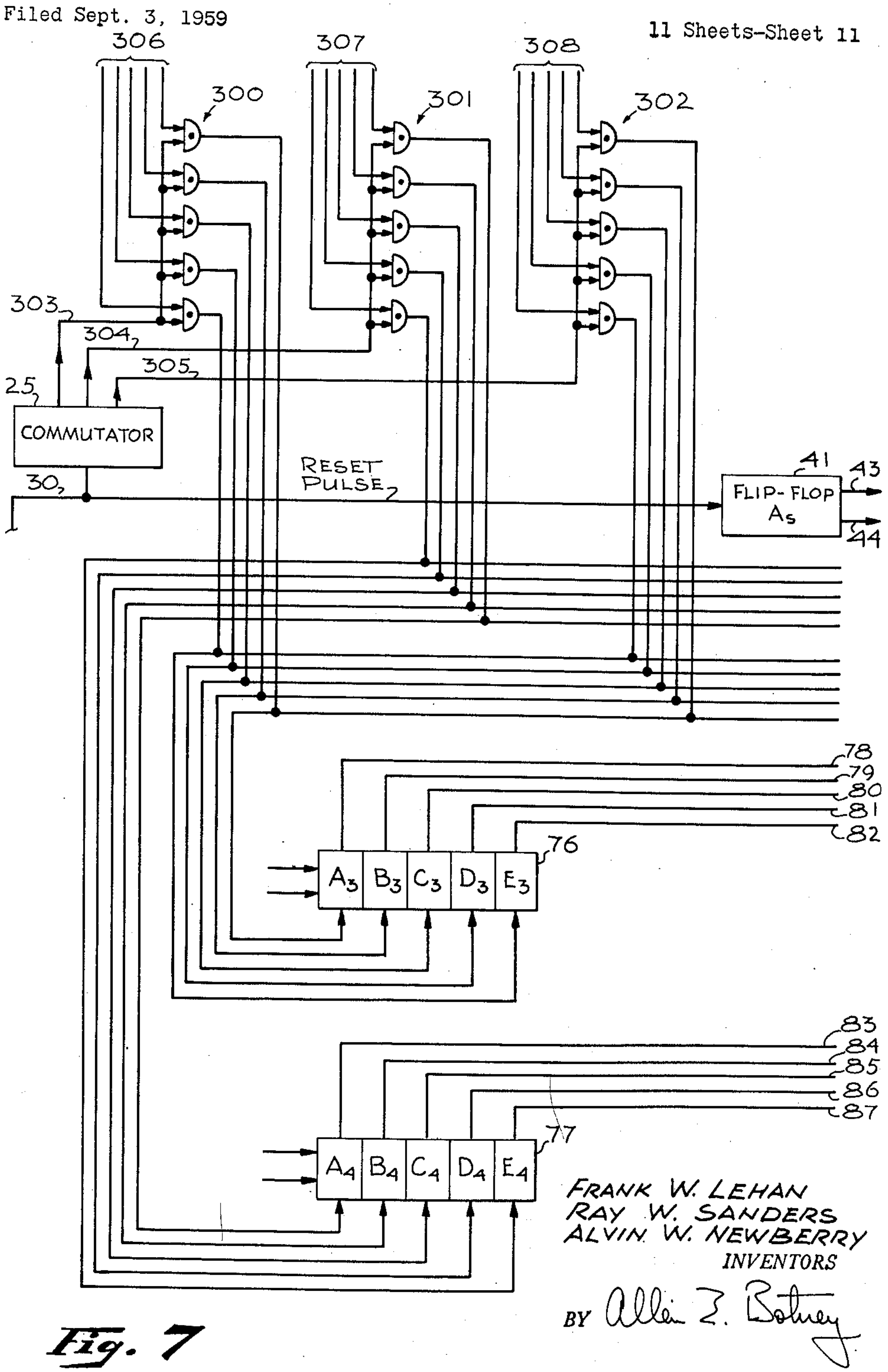

FIGURE 7 illustrates a modification of the invention wherein sequential rather than parallel digital data is applied.

Referring now to the drawings, particular reference is made to FIGS. 1*a* and 1*b* wherein are respectively shown the basic units of the airborne and ground portions of a telemetry system according to the present invention.

Considering FIG. 1*a* first, the airborne apparatus comprises a commutator 10 to which information in the form of analog signals is applied via a plurality of input terminals **11*a*–11*n*. The commutator is in the nature of a switch which successively connects each input terminal into the system, thereby permitting a large number of information channels to be handled by the system. Commutator 10 is connected to an analog-to-digital converter 12** which, as the name implies, converts analog signals to corresponding signals in digitalized form. Both commutators and analog-to-digital converters are well known in the electronic arts and hence a detailed description of these units is not deemed necessary.

Analog-to-digital converter 12 is connected at its plural outputs to a Reed-Muller code generator 13 which, in turn, is connected to a conventional modulator-transmitter section 14. Code generator 13 puts the signals out of the analog-to-digital converter into coded form, the code preferred for this purpose being the Reed-Muller code although other codes could be used as well. The Reed-Muller code has already been discussed and, wherever necessary, will be gone into again later in greater detail. Modulator-transmitter 14 is coupled to an antenna 15 by means of which the signals ultimately produced by the apparatus of FIG. 1*a* are radiated into space.

Considering now FIG. 1*b*, the ground portion of the system is shown to basically comprise a conventional antenna and receiver 16 and 17, respectively, the receiver output being connected to a delay line element 18 which may be any type of delay line but which is preferably a magnetostriction type of delay line, as previously mentioned. Moreover, delay line 18 is multi-tapped, the spacings along the line between taps being determined by the number of different coding arrangements utilized. The delay line and the arrangement of its taps will be explained in greater detail later.

A decoding matrix, generally designated 20, is connected to delay line 18 at the latters taps. In essence, decoding matrix 20 may be said to consist of a plurality of "matched" filters which will be described in greater detail when the system itself will be described in greater detail. For the present, let it suffice to say that each filter of matrix 20 is of a type that will "recognize" a discrete pattern of pulses or coded bits of information simultaneously appearing at the associated combination of delay line taps.

Decoding matrix 20 is connected at its output end to a detector network which, for the sake of clarity, is herein called a "greatest of" detector and is designated 21. As heretofore mentioned, detector 21 preferably includes a plurality of transistors, one for each filter in decoding matrix 20, with the emitters thereof connected to a common resistor. By this arrangement, the detector is able to determine which of the filters in decoding matrix 20 has the greatest output signal. "Greatest of" detector 21 is connected at its output end to a digital conversion matrix 22 which, in turn, is preferably connected at its end to some display and/or recording equipment 23, as shown in the figure. Digital conversion matrix 22 is the sort of apparatus that will convert the decoded but still digitalized signals to substantially the same analog signals received at terminals **11*a*–11*n*** in FIG. 1*a*.

Finally, a synch generator 24 is connected between delay line 18 and detector 21 for coordinating the various actions of the system in a manner that will be clearly understood from a later detailed description.

In operation, a number of analog signals representing a number of different types of information or data, such as pressure, temperature, radiation intensity, etc., are applied to input terminals **11*a*–11*n*. These analog signals are sampled rotatively, that is, in turn, by commutator 10 and at a predetermined rate, the signal samples being successively applied to analog-to-digital converter 12**. The converter quantizes each of the input data samples which is to say that the converter transforms each analog signal sample into a digital representation thereof. Any one of a number of well known techniques may be used for achieving the conversion. One such method is employed herein and involves generating a "staircase" voltage until its voltage level is equal to or exceeds the voltage value of the data sample. When this occurs, a counter, which has been counting clock pulses from the start of the staircase voltage, is stopped and the number stored in the counter at the time is proportional to the magnitude of the data sample. This number is, therefore, the digitalized representation of the analog data sample.

Following conversion, the quantized or digitalized data samples are applied to code generator 13 wherein they are coded in accordance with the principles of the Reed-Muller code. Once coded, the signals in their coded form are then applied to modulator-transmitter 14 wherein the signals are employed to modulate a radio-frequency carrier generated in section 14. The modulated carriers are then amplified, etc. in the transmitter portion of section 14, as is customary, and thereafter applied to antenna 15 which radiates the modulated carriers containing this digitalized information into space.

At the ground portion of the present telemetry system, the radiated signals are intercepted by antenna 16 and then passed on to receiver 17 which amplifies and demodulates the coded carriers. In this manner, signals in digitalized and coded form are applied to delay line 18 whereat they are successively produced at the delay line taps. The various summing networks or filters of decoding matrix 20 receive the signals produced at the delay line taps and pass them on to "greatest of" detector 21. It will be recognized by those skilled in the art that the signals out of matrix 20 at the various output terminals thereof are of varying amplitude as the signals are propagated down the delay line but that at one point in time a signal at one of the matrix output terminals will have the greatest or maximum amplitude. This is due to the fact that at this point in time the entire group of signals representing a data sample simultaneously appear at a set of taps whereas at other times less than the entire group of signals simultaneously appear at the taps.

"Greatest of" detector 21 simultaneously compares all outputs from decoding matrix 20 and determines which output is greatest. Accordingly, delay line 18, decoding matrix 20 and "greatest of" detector 21 cooperatively act to decode the Reed-Muller coded signals received at the ground installation. However, the original data sample is still digitally represented. Consequently, the output of detector 21 is applied to digital conversion matrix 22 wherein the digitalized signal is reconverted to its original analog form. Following this, the analog signal may now either be visually displayed or recorded, or both, by display and recording equipment 23.

With respect to the operation of synch generator 24, it should be mentioned that in order to realize the maximum advantage of the matched filter decoder matrix, it is necessary to evaluate the signal generated at the output of each filter only when the coded signals in the delay line are in complete register with the filters. If this is done, the ideal output may be said to be plus unity at the filter corresponding to the code transmitted, minus unity at the filter corresponding to the inverse or complement of the code transmitted, and zero at all other filters. Accordingly, synchronizing information must be transmitted. The method of synchronization is to generate one group of coded signals having properties of low auto-correlation at any position in the matched filter array except complete "match," and thus generate at one filter output a signal that is always near zero except at one time during each period. This signal is then used in the locked-loop "flywheel" type of apparatus to generate a gating signal allowing all filter outputs to be compared only during one short interval each period. This arrangement will be described further in subsequent paragraphs.

Referring now to FIGS. 2*a* and 2*b*, the airborne portion of the telemetering system of the present invention is shown in much greater detail. Considering FIG. 2*a* first, the airborne apparatus includes a commutator 25 to which is connected a number of input terminals, such as input terminals 26, 27 and 28, by means of which analog data is applied to the commutator for sampling. Commutator 25 has a pair of output lines 30 and 31, line 30 being used to connect the commutator to a *t*-position binary scaler 32 where "*t*" is any integer. Scaler 32 is shown as a 5-position scaler in the figure, the several stages therein being designated $A_0$ to $E_0$. Furthermore, scaler 32 is a resettable counter type of device that is oftentimes referred to as a "ring" counter and, as will be seen from the description in later paragraphs, it has a function associated with automatic ground station operation.

With respect to output line 30, this line connects commutator 25 to still other units in the system as will be mentioned later when FIG. 2*b* is taken up for discussion, but in FIG. 2*a* line 30 remains open-ended, the end thereof being designated by the letter "*a*" for purposes of identification. It should be mentioned here that still other lines will remain open-ended in FIG. 2*a* and that the open ends of these lines will also be identified by letters of the alphabet. Line 30 as well as the other open-ended lines of FIG. 2*a* are continued in FIG. 2*b* as will be seen later and, to faciiltate a correct recognition and association of the referred-to lines, the open ends of the lines in FIG. 2*b* are also identified by the same letter of the alphabet.

Scaler 32 is connected at its output end, that is, at the output end of stage $E_0$, to a one-shot multivibrator 33 which, in turn, is connected to both a shaping circuit 34 and an inhibit gate 35. Inhibit gate 35 has three input terminals, two of which are inhibit terminals, and multivibrator 33 is connected to one of these inhibit terminals. An open-ended lead 36 is connected to the junction of multivibrator 33 and shaping circuit 34, the open end of the lead being designated "*x*." Another one-shot multivibrator 37 is connected between shaping circuit 34 and the other of the two inhibit terminals of gate 35, the output line of multivibrator 37 being designated 38 and, since line 38 is also open-ended, its end is identified by the letter "*y*." The third input of inhibit gate 35 is connected to the output end of a shaping circuit 40, the output end of circuit 40 also being connected to a flip-flop circuit 41 at the input end thereof. The output terminal of gate 35 is connected to an additional input terminal to commutator 25 whereas the input to shaping circuit 40 is provided by means of a line designated 42. Considering flip-flop 41 still further, it is well known that circuits of this kind customarily have a pair of complementary output terminals. Accordingly, flip-flop circuit 41 has two output lines which are respectively designated 43 and 44. Since lines 43 and 44 are open-ended, the open ends of these lines are designated by the letters "*v*" and "*w*."

The apparatus of FIG. 2*a* further includes a clock in the form of a crystal oscillator 45 which determines the system data rate by providing a crystal controlled time reference. A binary scaler or resettable counter 46 having "I" stages is coupled to crystal oscillator 45, the output of each stage in the counter, that is, the outputs of the "I" counter stages, being respectively connected to a corresponding number of inputs to a data programmer 47. In addition, crystal oscillator 45 is also connected to an input of data programmer 47, as shown in the figure.

Data programmer 47 is connected at its output end to a 5 position binary scaler 48 and to an associated pair of command gates 50 and 51 as well. Gates 50 and 51 each have three input terminals, the data programmer being connected to only one terminal of each gate. As suggested above, scaler 48 has 5 stages, the output of each stage respectively being coupled through a resistor to a common junction point 52 which is itself connected to the input of a comparator network 53. The five resistors are designated 54 to 58 inclusive, and junction point 52 is coupled to ground through a sixth resistor 60. Considering scaler 48 still further, the second through the fifth stages, namely stages $B_2$ through $E_2$, have additional outputs that are respectively connected to a corresponding number of wire leads 61 through 64. Since these leads are open-ended, they are designated at their open ends by the letters "*r*," "*s*," "*t*" and "*u*." Moreover, leads 61 to 64 are respectively connected to an additional set of four leads 65 through 68 that are also open-ended, the ends of these latter leads being identified by the letters "*i*," "*j*," "*k*" and "*l*." Finally, it should be mentioned that wire lead 61 is connected to line 42 and, therefore, interconnects the second output of stage $E_2$ in scaler 48 with the input to shaping circuit 40.

Returning now to command gates 50 and 51, it will be remembered that each of the gates has three input terminals and that one terminal from each is connected to data programmer 47. A pair of leads 70 and 71 are respectively connected to the second input terminals of gates 50 and 51, the open ends of these leads respectively being designated "*b*" and "*c*." As for the remaining third input terminals of gates 50 and 51, they are inhibit terminals and both are connected to the output end of comparator 53.

Associated with command gates 50 and 51 is a pair of shaping circuits 72 and 73, each of these latter circuits having only one input terminal. The input terminal of shaping circuit 72 is electrically joined to lead 70 whereas the input terminal of shaping circuit 73 is similarly joined to lead 71. Considering command gates 50 and 51 and shaping circuits 72 and 73 together, the output ends of gate 50 and shaping circuit 72 are respectively connected to the two input terminals of a 5-position binary scaler 76 while the output ends of gate 51 and shaping circuit 73 are respectively connected to the two input terminals of a 5-position binary scaler 77. The five stages of scaler 76 are designated $A_3$ to $E_3$ inclusive and the output terminals of these five stages are respectively connected to five open-ended wire leads designated 78 to 82 inclusive. The open ends of leads 78 to 82 are respectively identified by alphabet letters *"m," "n," "o," "p"* and *"q."* Similarly, the five stages of scaler 77 are designated $A_4$ to $E_4$ inclusive and the output terminals of these five stages are respectively connected to five open-ended wire leads designated 83 to 87 inclusive. The open ends of leads 83 to 87 are respectively identified by alphabet letters *"d," "e," "f," "g,"* and *"h."*

Having thus described the portion of the airborne system shown in FIG. 2*a*, reference is now made to FIG. 2*b* wherein is shown the other portion of the airborne system and wherein the open-ended wire leads and their ends are respectively given the same numerical and alphabetic designations as their counterparts in FIG. 2*a*. Continuing in the description of the apparatus in FIG. 2*b*, the set of codes utilized in this invention are produced at the outputs of a plurality of AND gates designated 88 through 97 which are connected to binary scaler 76 and 77 in FIG. 2*a*.

More particularly each of AND gates 88 to 97 has three input terminals. With respect to the first terminals of these AND gates, the first input terminals of gates 88 and 89 are connected by means of lead 64 to the $B_2$ stage of binary scaler 48, the first input terminals of gates 90 and 91 are connected by means of line 63 to the $C_2$ stage of binary scaler 48, the first input terminals of gates 92 and 93 are connected by means of line 62 to the $D_2$ stage of binary scaler 48, and the first input terminals of gates 94 and 95 are connected by means of lead 61 to the last stage, namely, the $E_2$ stage, of binary scaler 48. As for the first input terminals of gates 96 and 97, these terminals are unconnnected and the fact that they are not connected to any other elements in the system is indicated by the letters NC which is an abbreviation for "No Connection."

It will be noticed from an examination of FIG. 2*a* that lines 65 to 68 are respectively connected to lines 61 to 64. Consequently, the first input terminals of gates 88 to 95 are also connected via lines 65 to 68 to a synchronized code generator 98, lines 65 to 68 respectively making connection to four input terminals of the code generator. More specifically, the first input terminals of AND gates 88 and 89 are connected through lines 64 and 68 to a first input terminal of code generator 98, the first input terminals of gates 90 and 91 are connected through lines 63 and 67 to a second input terminal of code generator 98, the first input terminals of gates 92 and 93 are connected through lines 62 and 66 to a third input terminal of generator 98 and, finally, the first input terminals of gates 94 and 95 are connected through lines 61 and 65 to a fourth input terminal of the generator.

Considering now the second and third input terminals of AND gates 88 to 97, it will be seen from tracing the various connections that the second input terminals of gates 88, 90, 92, 94 and 96, are respectively connected by means of lines 78 to 82 to the outputs of the five stages $A_3$ to $E_3$ of binary scaler 76 and that the second input terminals of gates 89, 91, 93, 95 and 97 are respectively connected by means of lines 83 to 87 to the outputs of the five stages $A_4$ to $E_4$ of binary scaler 77. Being specific by way of example, the second input terminal of gate 88 is connected by means of line 78 to the $A_3$ stage output of scaler 76 and the second input terminal of gate 89 is connected by means of line 83 to the $A_4$ stage output of scaler 77. The second input terminals of the remaining gates are similarly connected to the various stages of scalers 76 and 77 in the manner described above. As for the third input terminals of gates 88 to 97, these terminals are interconnected with each other by means of lines 43 and 44. Thus, the third input terminals of gates 88, 90, 92, 94 and 96 are connected to line 44 and, therefore, to each other and, likewise, the third input terminals of gates 89, 91, 93, 95 and 97 are connected to each other by being connected to line 43. Furthermore, since lines 43 and 44 are respectively connected to the two output terminals of flip-flop circuit 41 in FIG. 2*a*, the third input terminals of gates 88 to 97 are also connected to either one or the other of the output terminals of the above-mentioned flip-flop circuit.

Considering the connections of AND gates 88 to 97 still further, these gates are respectively connected through a corresponding number of resistors 99 to 108 to a plurality of half adders 109 to 112, the adders themselves being connected in tandem. More specifically, AND gates 88 and 89 are respectively connected through resistors 99 and 100 to one of two input terminals to half adder 109, AND gates 90 and 91, on the other hand, being connected through resistors 101 and 102 to the other input terminal to this half adder. Similarly, AND gates 92 and 93 are respectively connected through resistors 103 and 104 to one of two inputs to half adder 110, AND gates 94 and 95 are respectively connected through resistors 105 and 106 to one of two inputs to half adder 111, and AND gates 96 and 97 are respectively connected through resistors 107 and 108 to one of two inputs to half adder 112. As for the second inputs to the last three half adders, the output of half adder 109 is connected to the second input to half adder 110, the output of half adder 110 is connected to the second input to half adder 111 and, finally, the output of half adder 111 is connected to the second input to half adder 112. In general, a half adder circuit has two inputs and two outputs and is of a type wherein if a pulse appears only at one input, a pulse appears on one of the outputs, generally designated the "sum" output. On the other hand, if a pulse appears at both inputs, a pulse appears at the other output, generally designated the "carry" output. The half adders used herein, namely, half adders 109 through 112, are of this type, the "carry" output being the one employed in the system. A half adder circuit that may easily be adapted for use in the present system is shown and described in the patent to E. L. Younker for an invention entitled "Binary Half Adder," Patent No. 2,901,602, issued August 25, 1959.

The airborne equipment of FIG. 2*b* includes another half adder 113 of the type mentioned above which also has two input terminals. Synch code generator 98 is connected to one of these two input terminals, the other of them being connected to the output of an inhibit gate 114. Gate 114 has three input terminals, two of which are for inhibit purposes. One of these two is connected by means of line 30 to commutator 25 and, therefore, to binary scaler 32 in FIG. 2*a*, the other is connected via line 38 to one-shot multivibrator 37 and, therefore, to inhibit gate 35, also in FIG. 2*a*. The third of the gate 114 input terminals is connected to the output end of half adder 112.

The output end of half adder 113 is connected to one of two input terminals to another inhibit gate 115, the other input terminal to gate 115 being the inhibit terminal which is connected to line 36 and by means of this line to the output of one-shot multivibrator 33 in FIG. 2*a*. The output of gate 115 is electrically tied to a set of low-pass filters, only two of the filters in the set, namely, filters **116*a* and 116*n* being shown in the figure. However, there are actually as many such filters as there are digit transmission rates. The outputs of filters 116*a*–116*n* are respectively connected to the multiple terminals of a switch by which the filters may be selectively connected to a modulator 117 which is further connected between a crystal oscillator 118 and a power amplifier 119. The output of power amplifier 119 is coupled to an antenna 120**.

Having thus described the arrangement of the airborne portion of a telemetry system according to the present invention, reference is now made to FIGS. 3*a* and 3*b* wherein is shown the ground station apparatus for such a system. Here again it should be mentioned that lines originating in FIG. 3*a* and ending in FIG. 3*b*, as well as their open ends, will be identically designated.

Considering FIG. 3*a* first, the ground equipment includes an antenna 121 coupled to a conventional phase-locked receiver 122 that is coupled at its output end to a couple of phase detectors 123 and 124 shown in FIG. 3*b*. The connections between receiver 122 of FIG. 3*a* and phase detectors 123 and 124 of FIG. 3*b* is accomplished by means of a line 125, the open ends of the line being designated "A" in the two figures. Also connected to an input of phase detector 123 in FIG. 3*b* is a 90° phase shifter circuit 126 and connected between the phase shifter and phase detector 124 is a voltage controlled oscillator 127 which, as its title implies, is of a type that has its frequency affected by the voltage applied to it. Such oscillators are well known in the art so that a detailed description of this circuit is not deemed essential.

Phase detector 123 is connected at its output end to an integrating circuit 128, the output of this circuit being connected in turn to one of two inputs to a conventional relay amplifier 130. The second input to relay amplifier 130 is connected to a voltage source (not shown) which applies a biasing voltage to the amplifier as indicated in the figure by the word Bias. Relay amplifier 130 is connected at its output end to both a delay multivibrator 131 and a switch 132, the latter, by its operation, connecting either a first tracking filter 133 or a second tracking filter 134 between phase detector 124 and voltage controlled oscillator 127. As will be seen later, by connecting-in one or the other of filters 133 and 134, switch 132 controls the tracking filter bandwidth characteristics such that the bandwith is increased while the apparatus is in what might be called the acquisition phase, thereby allowing faster search and lock (during the "carrier lock" mode of operation when the carrier is unmodulated). When the carrier is acquired, the second switch position narrows the tracking filter bandwidth in preparation for modulated carrier reception, a condition during which most of the transmitted energy is contained in the carrier sidebands.

The junction point between phase detector 124 and either of filters 133 and 134, designated 135 in the figure, is connected to a set of low-pass data filters which are compatible with the airborne system digit rates, the receiver video bandwidth characteristics being determined by the particular filter selected from among them. For sake of clarity, only two data filters, designated **136*a* and 136*n*, respectively, are shown in the figure. However, there are actually as many such filters as there are digit transmission rates. The outputs of the data filters are respectively connected to the multiple terminals of a switch, generally designated 137, by means of which the selection of a data filter is made for connection to a balanced modulator 138 at one of the inputs thereof. The other input to balanced modulator 138 is coupled to a delay line carrier generator 140** which generates a signal at the appropriate frequency to provide a drive for the delay line portion of certain decoder apparatus which will now be described.

The decoder apparatus is generally designated 141 and is, basically, a unique correlation detection system the heart of which is a magnetostriction delay line 142. Delay line 142 is preferably made of a nickel alloy material and is characterized in the present system by a 5.25 microsecond time delay per inch of length. Moreover, the delay line provides a linear input-output operating range of approximately 40 db and is usable from approximately 100 kilocycles to 1 megacycle. As designed for use herein, the half power points are approximately 200 and 600 kilocycles. Stated differently, the delay line herein has linear amplitude and phase characteristics and can store information in the form of a pulse code or in the form of a carrier with sidebands.

Information is introduced on delay line 142 by means of a transducer consisting of a coil 143 wound on the basic delay line material which, as was previously mentioned, may be a wire or ribbon of a nickel alloy. Energy is propagated down the line at the velocity of sound in the material and is absorbed in a damping device at the far end (not shown). Along the length of the line, transducers similar to the "launch" transducer can recover the information, delayed by a time increment determined by the spacing between the "launch" and "pickup" transducers. Thus, the "pickup" transducers are also coils and they are designated $\mathbf{144_1}$ to $\mathbf{144_n}$ in the drawing where "*n*" is an integer greater than 1. In the embodiment shown in FIG. 3*b*, "*n*" is shown to be 80 which means that there are preferably 80 "pickup" coils in the decoder apparatus although only a few of these are shown.

As used in this invention, the "pickup" transducers or delay line "taps," that is, coils $\mathbf{144_1}$ to $\mathbf{144_n}$, are spaced along the delay line at delay increments corresponding to the airborne system data or digit rate. Thus, for example, the maximum data rate corresponds to the minimum spacing of the coils along the delay line, the minimum data rate, on the other hand, corresponding to the maximum spacing of the coils. As preferred in the system being described, the minimum spacing between the coils is 2.44 microseconds so as to allow code pulses to be transmitted at a rate of 409,600 per second. Hence, for a 32-level code having a 16-digit pulse group for each code level, the maximum code rate is approximately 25,600 (409,600÷16) codes per second which corresponds to a bit rate of 128,000 (25,600×5) bits per second. The maximum spacing between coils, on the other hand, is 625 microseconds and this corresponds to a code rate of 100 codes per second or, stated differently, a transmission of 500 bits per second under the basic 32-level coding scheme. Between the maximum and minimum spacing of the coils, the coils are successively spaced apart by 4.88 microseconds, 9.76 microseconds, 19.52 microseconds, etc. In order to minimize the total number of coils and still provide this range of transmission rates, the delay line is designed with 16 coils at the minimum spacing of 2.44 microseconds. To obtain 16 coils at twice this spacing, 8 of the first 16 coils are used followed by 8 coils spaced 4.88 microseconds apart. These coils are followed by 8 coils at 9.76 microseconds, followed by 8 at 19.52 microseconds, etc. so that the final 8 coils are spaced 625 microseconds apart. A total of only 80 coils are thus required for the system, 16 of which are active at any one time. Thus, more specifically minimum spaced coils $\mathbf{144_1}$, to $\mathbf{144_{16}}$ correspond to the maximum data rate; coils $\mathbf{144_2}$, $\mathbf{144_4}$, $\mathbf{144_6}$, $\mathbf{144_8}$, $\mathbf{144_{10}}$, $\mathbf{144_{12}}$, $\mathbf{144_{14}}$, $\mathbf{144_{16}}$ and coils $\mathbf{144_{17}}$ to $\mathbf{144_{24}}$ correspond to the next highest data rate, etc.; coils $\mathbf{144_{52}}$, $\mathbf{144_{56}}$, $\mathbf{144_{60}}$, $\mathbf{144_{64}}$, $\mathbf{144_{66}}$, $\mathbf{144_{68}}$, $\mathbf{144_{70}}$, $\mathbf{144_{72}}$, and coils $\mathbf{144_{73}}$ to $\mathbf{144_{80}}$ being maximum spaced and corresponding to the minimum data rate.

In effect, the tapped delay line, together with a resistor matrix and output bus arrangement to be described next, constitute the inverse of the airborne code generator.

Connected to coils $\mathbf{144_1}$ to $\mathbf{144_n}$ are *n* electrical lines or busses $\mathbf{145_1}$ to $\mathbf{145_n}$, one buss being connected to each coil at an end thereof, the other end of each coil being grounded. Thus, the buss designated $\mathbf{145_1}$ is connected to an end of coil $\mathbf{144_1}$, buss $\mathbf{145_2}$ is connected to an end of coil $\mathbf{144_2}$, preferably the same end, etc., buss $\mathbf{145_n}$ being connected to the analogous end of coil $\mathbf{144_n}$. Hence, busses $\mathbf{145_1}$ to $\mathbf{145_n}$ constitute a first set of busses equal in number to the number of coils and since it was previously indicated that the apparatus of FIG. 3*b* preferably contains 80 coils, then there are 80 busses in the first set. A second set of 32 busses is non-conductively crossed with the first set of busses in a sort of checkerboard fashion, as shown in the figure. These busses are designated $146_1$ to $146_n$, where $n$ here equals 32. Thirty-two busses are included in the second set for the reason that in the particular embodiment of the invention being described, a 32-level coding scheme is utilized as heretofore mentioned. Accordingly, for each 16-digit pulse group in a code level, there is a buss associated therewith.

Busses $146_1$ to $146_{n=32}$, that is, the 32 busses, are connected to a set of 16 difference amplifiers designated $147_1$ to $147_{n=16}$, two busses being connected to each such amplifier. Thus, busses $146_1$ and $146_2$ are connected to the two inputs of difference amplifier $147_1$, busses $146_3$ and $146_4$ are connected to the two inputs of difference amplifier $147_2$, etc., busses $146_{31}$ and $146_{32}$ being connected to the two inputs of difference amplifier $147_{16}$. For sake of clarity, however, only two difference amplifiers are shown in the figure, namely, difference amplifiers $147_1$ and $147_{n=16}$. The output lines from the difference amplifiers also number sixteen and are designated $148_1$ to $148_{n=16}$. However, here again, for sake of clarity, only two such output lines are shown, namely, lines $148_1$ and $148_{n=16}$ from difference amplifiers $147_1$ and $147_{n=16}$, respectively. The open ends of these lines in FIG. 3*b* are indicated by the letters "B" and "Q."

A plurality of resistors are connected between the two sets of busses at selected points of intersection, the points of intersection being chosen in such a manner that 32 different connection patterns are formed that respectively correspond to the 32 different pulse groups of the 32-level coding scheme. Stated differently, the resistors interconnect the two sets of busses in such a manner that a maximum signal will appear at the output of a difference amplifier when complete correlation exists between an input code or pulse group and the matched decoder matrix formed by the delay line taps, the two busses leading in to the difference amplifier and the resistors interconnecting said taps and busses.

Looking to FIG. 3*b* it will be seen that busses $145_1$ to $145_{16}$, busses $146_1$ and $146_2$, and the resistors interconnecting busses $145_1$ to $145_{16}$ with busses $146_1$ and $146_2$ constitute one matched filter of decoder 141. Similarly, busses $145_1$ to $145_{16}$, busses $146_3$ and $146_4$, and the resistors interconnecting busses $145_1$ to $145_{16}$ with busses $146_3$ and $146_4$ constitute another matched filter of the decoder, etc., the resistors interconnecting busses $145_1$ to $145_{16}$ with busses $146_{31}$ and $146_{32}$ constituting the last and, therefore, the sixteenth matched filter. Hence, for each group of 16 coils corresponding to a particular data rate there is an associated group of 16 matched filters. In the examples presented immediately above, coils $144_1$ to $144_{16}$ were involved corresponding to the maximum data rate. Only some of the total number of resistors forming the many matched filters of the decoder are shown for sake of clarity and simplicity but it will be obvious that up to 256 resistors are required for each set of 16 matched filters servicing a particular data rate. In other words up to 256 resistors interconnect busses $145_1$ to $145_{16}$ with busses $146_1$ to $146_{32}$ to handle the 16 digit codes produced at coils $144_1$ to $144_6$. Similarly, up to 256 resistors are necessary for each of the other groups of 16 coils corresponding to a data rate.

It should further be mentioned here that each group of 16 coils is selectively connected to its associated group of 16 matched filters through a conventional switch so that when a particular data rate is selected for use, only the associated group of 16 coils and 16 matched filters are connected into the decoder. The other groups of coils corresponding to data rates other than the one selected are disconnected from their respective groups of matched filters by these switches. Thus, for example, if the system were operating at the maximum data rate, coils $144_1$ to $144_{16}$ would be connected through its switch to its 16 associated matched filters described above whereas the other coils would remain disconnected from their matched filters. Here again, to avoid encumbering the drawing and, therefore, to avoid confusion, the switches have been omitted.

Returning now to delay multivibrator 131 in FIG. 3*b*, the output end of multivibrator 131 is connected to one of two inputs to a gating circuit 158, a phase detector 160 being connected to the other of the gate inputs. As may be expected, phase detector 160 has two inputs. A filter 161 is coupled between the output end of gating circuit 158 and the input to a voltage controlled oscillator 162 which has two output terminals, one being connected to some shaping circuits 163 and the other going to one of the two input terminals to phase detector 160. The second of the phase detector inputs is fed by line 174 whose open end has been designated T. The output of the shaping circuits is an open-ended line 164, the open end of the line being indicated by the letter S. Another open-ended line, line 165 provides the output of carrier generator 140, the open-end of this line being indicated by the letter R.

Having thus described the portion of the ground system shown in FIG. 3*b*, reference is once again made to FIG. 3*a* wherein is shown the other portion of the ground system and wherein the open-ended lines and their ends are respectively given the same numerical and alphabetic designations as their counterparts in FIG. 3*b*.

Accordingly, the equipment of FIG. 3*a* includes a plurality of phase detectors $166_1$ to $166_{n=32}$ there being thirty-two phase detectors in the embodiment being shown and described as indicated by the fact that $n$ has been made equal to 32. Phase detectors $166_1$ to $166_{n=32}$ are connected to difference amplifiers $147_1$ to $147_{n=16}$ of FIG. 3*b* by means of lines $148_1$ to $148_{n=16}$, a pair of phase detectors being connected to each difference amplifier. More particularly, difference amplifier $147_1$ is connected via line $148_1$ to one of two inputs to phase detectors $166_1$ and $166_2$, difference amplifier $147_2$ is connected via line $148_2$ to one of two inputs to phase detectors $166_3$ and $166_4$, etc., difference amplifier $147_{n=16}$ being connected via line $148_{n=16}$ to one of two inputs to phase detectors $166_{31}$ and $166_{n=32}$.

Also connected to phase detectors $166_1$ to $166_{n=32}$, at their other inputs, are the input and output ends of a phase inverter 167, the input end of the phase inverter being connected via line 165 to delay line carrier generator 140. More specifically, the input end of phase inverter 167 is connected to all the even-numbered phase detectors, such as phase detectors $166_2$, $166_4$, $166_6$, etc., whereas the output end of the phase inverter is connected to all the odd-numbered phase detectors, such as phase detectors $166_1$, $166_3$, $166_5$, etc.

Phase detectors $166_1$ to $166_{n=32}$ are coupled at their output ends to what has been termed herein as a "greatest of" detector. This detector is designated 168 in the figure and its function, basically, is to determine which of the phase detectors is producing the greatest output signal. For this purpose, "greatest of" detector 168 includes a plurality of transistors, namely, one for each phase detector. Accordingly, thirty-two transistors are included herein, the transistors being generally designated $170_1$ to $170_{n=32}$. The base elements of transistors $170_1$ to $170_{n=32}$ are respectively connected to the output ends of phase detector $166_1$ to $166_{n=32}$. The collector elements of these transistors, on the other hand, are respectively connected through resistors $171_1$ to $171_{n=32}$ to a source of voltage designated B+. As for the emitter elements, these are all electrically tied to the same end of a resistor 172 whose other end is connected to the collector element of an additional transistor generally designated 173. The emitter element of transistor 173 is grounded and its base element is connected via line 164 to shaping circuits 163 in FIG. 3*b*. Finally, the junction between phase detector $166_1$ and the base element of transistor $170_1$ is connected by means of line 174 (the open ends of which are identified by the letter T) to the second input terminal of phase detector 160 in FIG. 3*b*.

Considering the output connections of "greatest of" detector 168, there are thirty-two such outputs, one from the collector element of each of transistors $170_1$ to $170_{n=32}$. The output from transistor $170_1$ is connected to one of several input terminals to a decommutator 175 whereas the remaining thirty-one outputs from transistors $170_2$ to $170_{n=32}$ are connected to a digital-to-analog converter 176 whose single output terminal is connected to another of the input terminals of decommutator 175. A third and last input terminal of decommutator 175 is connected by means of line 177 to line 164 and, therefore, is connected to both shaping circuit 163 in FIG. 3*a* and decommutator 175. Conventional apparatus may be utilized for digital-to-analog converter 176 and decommutator 175 and such apparatus would be familiar to anyone skilled in the art. Accordingly, no further description of them is deemed necessary. In essence, however, digital-to-analog converter 176 converts the signals that have been processed by the ground system to the original analog signals applied to the airborne system and decommutator 175 applies them in succession to three output terminals 178, 179 and 180 connected thereto.

Having completed a detailed description of the manner in which a telemetry system according to the present invention may be constructed, consideration will now be given to the operation of such a system and from the ensuing detailed description of the operation the underlying principles of the present invention will be more clearly understood and appreciated. In presenting the operation, the operation of the airborne portion of the system, as shown in FIGS. 2*a* and 2*b*, will be discussed first, followed by a discussion of the operation of the ground portion of the system shown in FIGS. 3*a* and 3*b*.

With respect to the operation of the airborne apparatus, it should first be mentioned that when the airborne system is turned On, three different types of transmission occur in sequence, the first transmission being the unmodulated RF carrier which provides the ground receiving station the best possibility of achieving carrier lock in a minimum of time. Next a coded synchronizing signal is transmitted and this is followed by a period of data transmission. The three transmitting periods are illustrated in FIG. 4*a* wherein one interval is labelled Carrier, another is labelled Synch Code and the third is labelled Data.

Figures 4A, 4B, 4C:
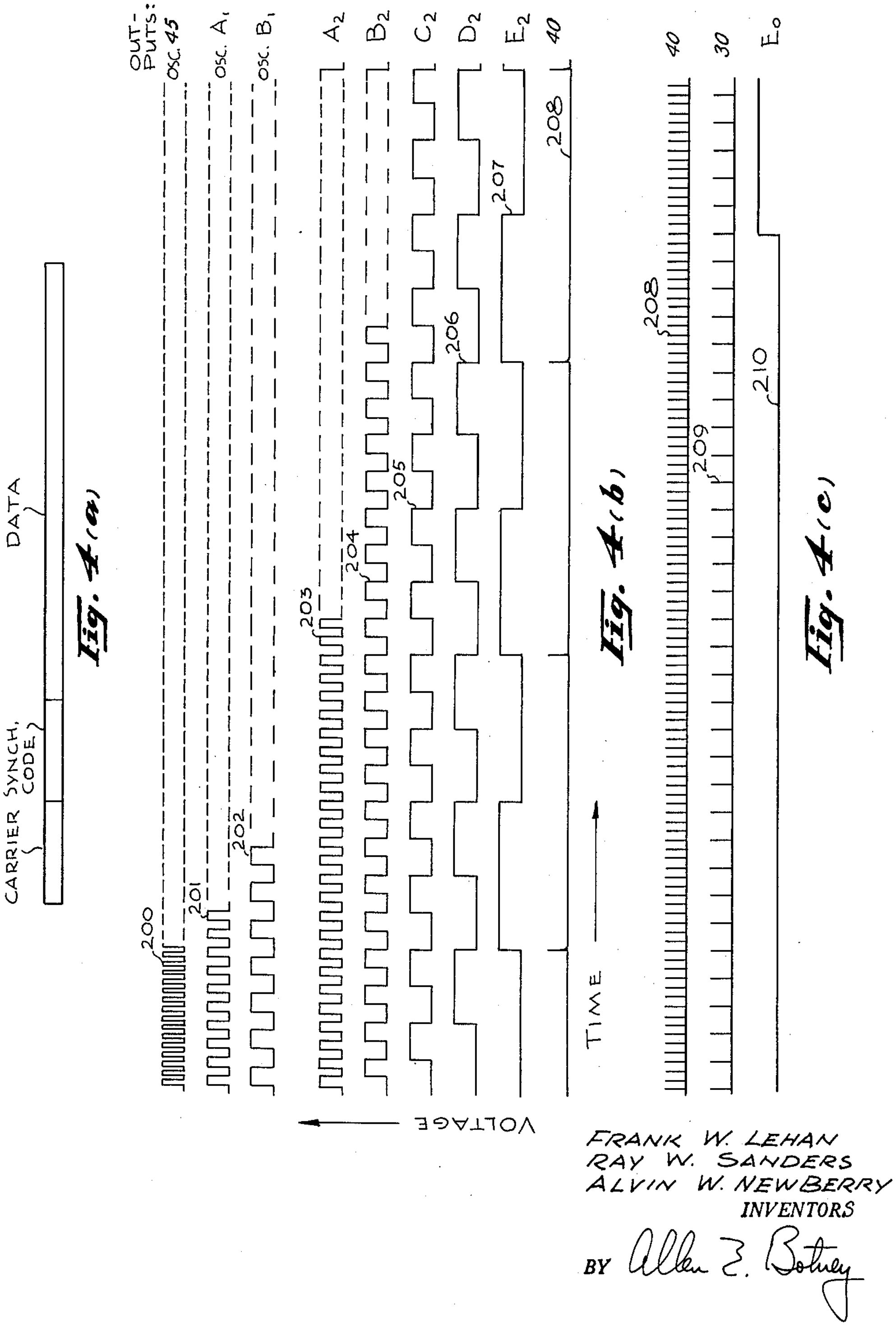

In order to undestand how the Carrier and Synch Code periods are provided, reference is now made to FIG. 4*b* wherein are shown three of the many possible data rates obtainable. Thus, waveform 200 represents the pulse train out of crystal oscillator 45 in FIG. 2*a* and corresponds to one data rate. Similarly, waveforms 201 and 202 respectively represent the pulse trains out of stages $A_1$ and $B_1$ in binary scaler 46 and they correspond to the second and third data rates. Other pulse trains corresponding to other data rates are produced by stages $C_1$, $D_1$, etc. up through $I_1$, but these others are not shown for the sake of simplicity. However, all pulse trains produced by scaler 46 are applied to data rate programmer 47 which is basically a switch device for selectively connecting the output terminal of the programmer to either the crystal oscillator or to any one of the scaler stages, thereby selectively obtaining any one of the several pulse trains at the programmer output. Data rate programmer 47 may be directed to select a particular pulse train and, therefore, a particular data rate, by automatic means or manually, or it may be directed from the ground by means of a command signal. For sake of discussion, it will be assumed that the output end of programmer 47 is connected to crystal oscillator 45, with the result that the data rate for the system is that produced by pulse train 200.

Accordingly, pulse train 200 is applied to binary scaler 48 and, in consequence thereof, pulse trains represented by waveforms 203 to 207 are respectively produced by binary stages $A_2$ to $E_2$. In accordance with the well-known principles of binary counter operation, the pulse repetition rate of pulse train 203 out of stage $A_2$ is one-half the pulse repetition rate of pulse train 200. Similarly, the pulse repetition rate of the pulse train produced by any one of the remaining stages, that is, stages $B_2$, $C_2$, $D_2$ and $E_2$, is one-half that of the pulse train produced by the preceding stage. It is thus seen that the pulse repetition rate of pulse train 200, that is, the data rate, is thirty-two times the pulse repetition rate of pulse train 207 out of stage $E_2$.

Considering pulse trains 203 to 207 still further, it should be mentioned at this time that although they are all of the same amplitude or voltage level at the output terminals of the scaler stages, they are of unequal amplitude as they appear across resistor 60. This difference in amplitude is due to the fact that resistors 54 to 58 at the output end of scaler 48 have unequal values of resistance. Specifically, the resistance of resistor 57 is twice that of resistor 58, the resistance of resistor 56 is four times that of resistor 58, the resistance of resistor 55 is eight times that of resistor 58 and the resistance of resistor 54 is sixteen times that of resistor 58. As a result, the voltage divider action between resistor 60 and resistors 54 to 58 varies so that the voltage level of pulse train 204 produced across resistor 60 is twice the voltage level of pulse train 203 produced across this resistor and, similarly, the voltage levels of pulse trains 205, 206 and 207 produced across resistor 60 are respectively four times, eight times, and sixteen times that of pulse train 203. Thus, it should be borne in mind that pulse trains of five different amplitudes or voltage levels are superimposed upon each other across resistor 60 and that their sum is applied to comparator 53. The effect of their being applied to the comparator will be considered later.

Considering the pulse trains produced by scaler 48 still further, it will be noted trom fhe figure that pulse trains 204 to 207 are also respectively applied to lines 64 to 61 and that of these, pulse train 207 is applied via line 42 to shaping circuits 40 wherein the pulse train is differentiated and gated to produce another pulse train 208 at the output thereof whose pulses or voltage "pips" coincide in time with the leading or rising edges of the pulses of pulse train 207. As shown, pulse train 208 is applied to gate 35 and through this gate to commutator 25. Pulse train 208, drawn to a much larger time scale, is again shown in FIG. 4*c*.

In response to the pulses or voltage "spikes" of pulse train 208, commutator 25 successively connects input terminals 26, 27 and 28 to output line 31 so that the analog signals applied to the input terminals are applied in turn and for the period of time between pulses to comparator 53. Stated differently, one pulse of pulse train 208 connects input terminal 26 to commutator line 31, the following pulse in the train connects terminal 27 to line 31 and the next following pulse connects terminal 28 to the line. The cycle is then repeated with succeeding pulses, the analog signals applied to the input terminals respectively being applied to comparator 53 for the period between successive pulses. The facts of this paragraph should also be borne in mind for discussions to be presented later.

Each time that commutator 25 is triggered through a complete cycle of connecting terminals 26, 27, and 28 to line 31, it generates a pulse or voltage spike at output line 30. Thus, for example, each time that terminal 26 is connected to line 31, a pulse appears on line 30. Since there are only three input terminals to commutator 25 in the embodiment presently being described, it will be obvious that one pulse is produced at output line 30 for each three pulses applied to the commutator. The train of pulses produced on line 30 is shown in FIG. 4*c* and is designated 209. Furthermore, as shown, the pulses of pulse train 209 are synchronized with every third pulse of pulse train 208.

Pulse train 209 is applied to binary scaler 32 and, as will be recognized by those skilled in the art, a pulse is generated by the scaler's $E_0$ stage for each group of thirty-two pulses applied to the scaler. In other words, in response to pulse train 209, scaler 32 generates a pulse train at the output of stage $E_0$ whose pulse repetition rate is one-thirty-second the pulse repetition rate of pulse train 209. This pulse train produced by the scaler is designated 210. As before, it is deemed necessary to use a larger time basis. Accordingly, pulse train 210 is reproduced on a larger time scale in FIG. 4*d*.

Pulse train 210 out of scaler 32 is applied to one shot multivibrator 33 which, in response thereto, generates another pulse train 211 whose pulses occur in synchronism with the leading edges of the pulses in pulse train 210. The relationship between the two trains of pulses is clearly shown in FIG. 4*d*. In addition to being applied to one of the inhibit terminals of inhibit gate 35, thereby preventing any further pulses from being applied to commutator 25 for the duration of each pulse, pulse train 211 is also applied to the inhibit terminal of inhibit gate 115 in FIG. 2*b* and thereby prevents any signal from being applied to modulator 117. As a result, the unmodulated carrier signal generated by crystal oscillator 118 is passed to power amplifier 119 for amplification and from the amplifier to antenna 120 for radiation into space. Thus, an unmodulated carrier is transmitted for the duration of each pulse in pulse train 211.

Figure 4D:
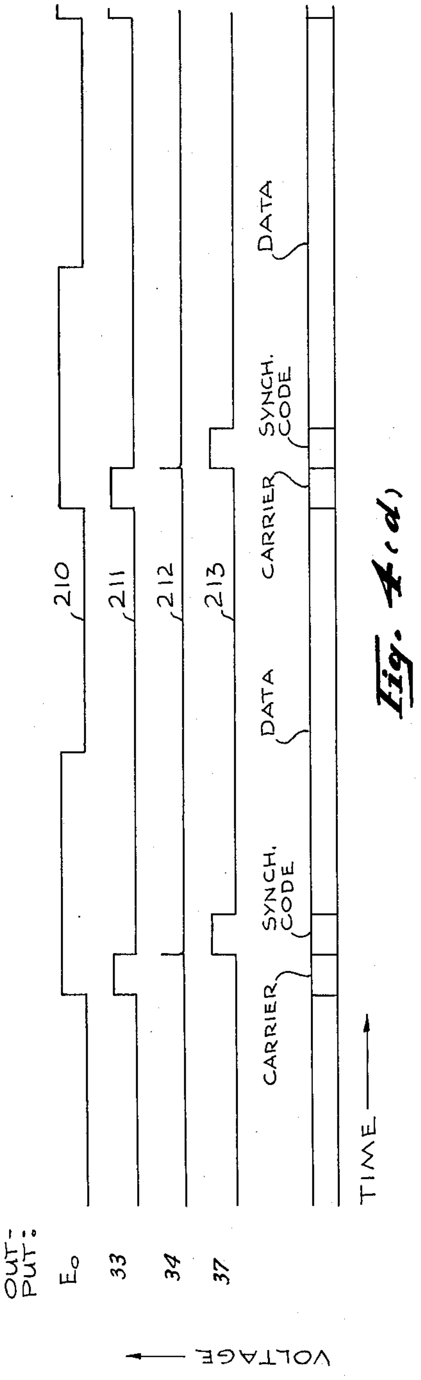

Pulse train 211 is also applied to shaping circuits 34 which first differentiates the pulses to produce positive and negative voltage spikes coincident with the leading and lagging edges, respectively, of these pulses. The shaping circuits then also gates out the positive voltage spikes and phase inverts the negative spikes to produce positive voltage spikes or pulses that coincide with the lagging edges of the pulses in pulse train 211. The train of positive voltage spikes out of shaping circuits 34 is shown in FIG. 4*d* and is designated 212. Pulse train 212 is applied to one shot multivibrator 37 which, in response thereto, produces a pulse train 213 which is substantially identical with pulse train 211 except delayed with respect to it by the duration of a pulse. In other words, the pulses of train 213 immediately follow the corresponding pulses of train 211 in time.

The pulses of pulse train 213 are applied to the other inhibit terminal of inhibit gate 35. Accordingly, for the duration of these pulses, no pulses applied to gate 35 by shaping circuits 40 can get through gate 35 to commutator 25. At the same time, the pulses of train 213 are applied via line 38 to one of the inhibit terminals of inhibit gate 114 in FIG. 2*b*, thereby preventing any data signals that may emanate from one-half adder 112 from passing through gate 114 to one-half adder 113. However, the output of synch code generator 98 is applied to adder 113 which, in turn, applies the synchronizing code to inhibit gate 115. Since gate 115 is not now inhibited by any pulse, the synchronizing code is passed by gate 115 to a selected one of low-pass filters **116*a*–116*n*, the particular filter selected corresponding to the data rate being utilized. After passing through the filter, the synchronizing code is applied to modulator 117 wherein it is used to modulate the carrier signal also being applied to the modulator. The synch code modulated carrier is then power amplified by amplifier 119 and radiated into space by antenna 120**. The synch code as well as the carrier and data transmitting periods are again illustrated in FIG. 4*d* as they were in FIG. 4*a* and by looking to the illustration in FIG. 4*d* it will be seen that the carrier transmitting period is coincident with the pulses of pulse train 211 and the synch code transmitting period is coincident with the pulses of pulse train 213. The data transmitting period is the interval between the synch code period and the next occurring carrier period.

Figure 4E:
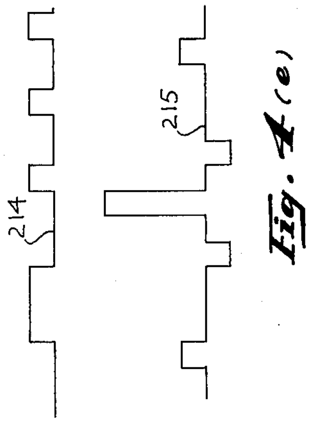

It should be mentioned briefly at this point that the synchronizing code generated by synch code generator 98 is one having properties of low auto-correlation at any position in the associated matched filter in the ground system decoder except at the position of complete "match," and thus generates at the filter output a signal that is always near zero except at one time during each period. This signal is then used to generate a gating signal allowing all matched filter outputs to be compared only during one short interval each period. The synchronizing code selected utilizes a 16-digit code as mentioned before and has the following form: 0001110001001001, where a "0" represents a "minus" condition and a "1" represents a "plus" condition. The voltage pattern of the synchronizing code under discussion is shown in FIG. 4*e* and is designated 214. The associated auto-correlation function is also presented in FIG. 4*e* as illustrated by waveform 215. Waveforms 214 and 215 are not related to each other in time in any manner although it might appear so from the figure.

Having thus completed a description of the manner in which the carrier and synchronizing code transmitting periods are produced and the kinds of signals generated during those periods, the data transmitting period is now taken up for discussion. Toward this end reference is made to the data samples appearing on line 31 at one input to comparator 53 and junction point 52 at the other input to comparator 53 whereat the 32-level step voltage appears. A typical data sample waveform is shown in part in FIG. 5*a* and is designated 216, a step voltage of the type produced herein, designated 217, also being shown in FIG. 5*a*. Here again, the data sample waveform and the step-voltage waveform are not related in time since, in actuality, one complete step-voltage pattern of 32-levels is generated during the period of each data sample. In describing the operation, only two successive data samples of waveform 216 will be taken for explanation since any description of the operation in connection with further data samples would only be repetitive in nature and, therefore, redundant. This fact will become clearer later.

Figure 5A:
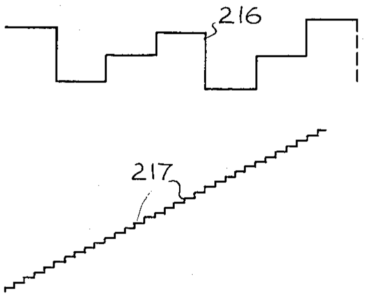
Figure 5B:
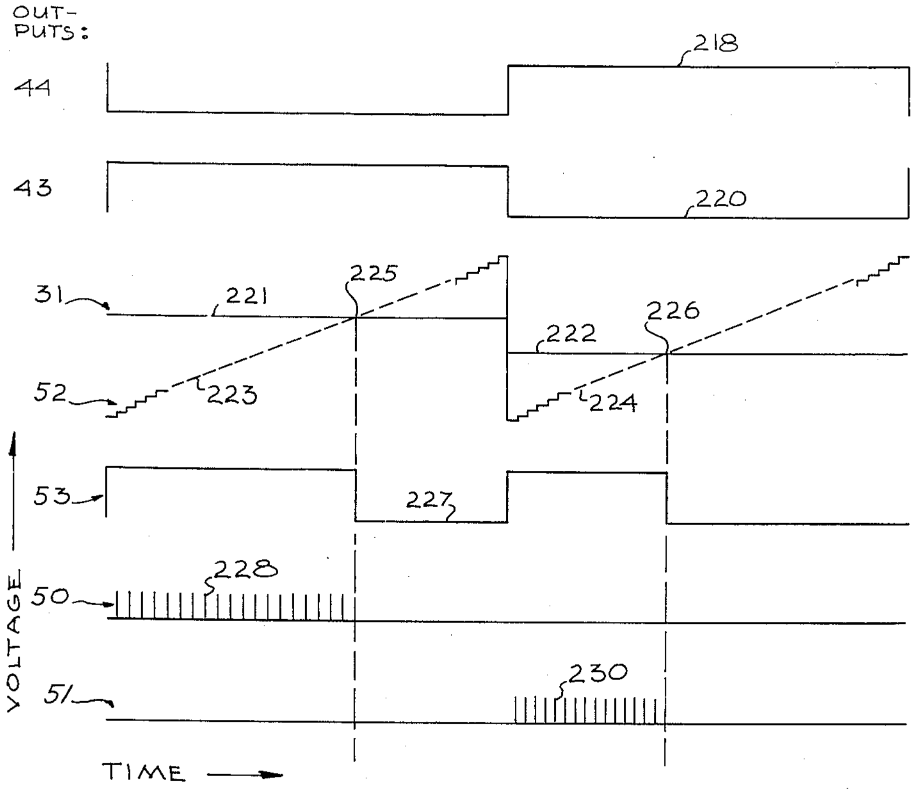
Figure 5B:
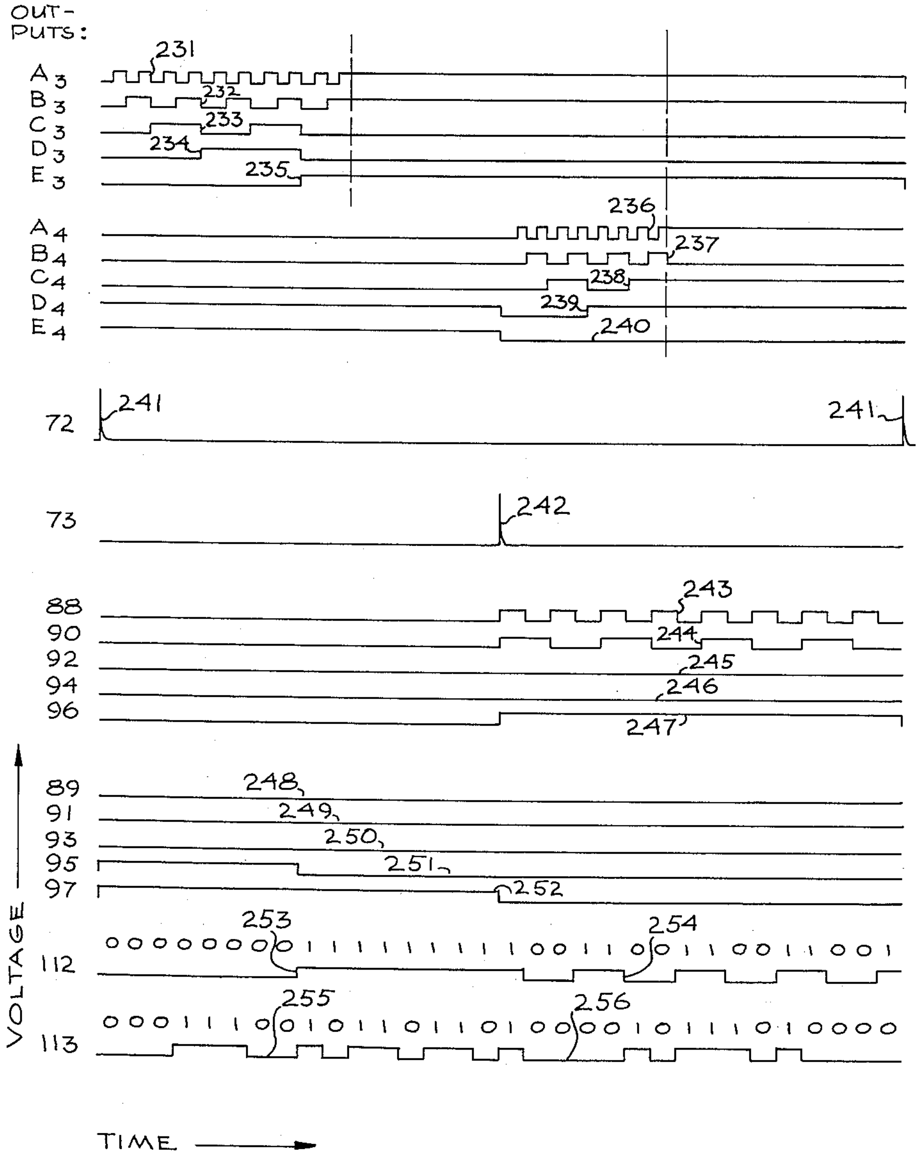

Reference is now made to FIG. 5*b* wherein are shown step voltages 218 and 220 produced at the two outputs of flip-flop circuit 41 in FIG. 2*a* in response to two successive voltage spikes out of shaping circuits 40, voltage waveform 218 appearing on output line 44 and voltage waveform 220 appearing on output line 43. As will be recognized, waveforms 218 and 220 are complements of each other which is to say that when line 44 is in a "0" or "minus" condition, line 43 is in a "1" or "plus" condition. Beneath waveforms 218 and 220 are shown two data sample voltages appearing in succession on line 31 and these are respectively designated 221 and 222. Superimposed upon each of the data samples is a 32-level step voltage developed at junction point 52 during the period of each data sample. The step voltages are designated 223 and 224, respectively, with step voltage 223 being superimposed on data sample 221 and step voltage 224 being superimposed on data sample 222. As can be seen from the superimposed voltage waveforms in the figure, at some point in time during the period of each data sample, the step voltage associated therewith reaches the voltage level of the data sample. Thus, for example, step voltage 223 has the same value as data sample voltage 221 at their point of intersection which is designated 225. Similarly, step voltage 224 has the same value as data sample voltage 222 at point of intersection 226.

Considering now the output line of comparator 53, the voltage level on this line is normally in a "1" or "plus" condition, which is to say that of the two levels it can assume, the comparator output is normally at the upper voltage level. The waveform representing the voltage output of comparator 53 is designated 227 in FIG. 5*b* and as can be seen, it is initially at its higher value. However, at times corresponding to points of intersection 225 and 226, the output voltage of the comparator drops to its possible lower value, that is, to a "0" or "minus" condition, and remains at this lower voltage level until the end of the data sampling period, at which time the comparator output returns to its normal upper value. The excursion of voltage 227 produced by comparator 53 during the periods of data samples 221 and 222 is clearly shown in the figure.

The output of comparator 53, that is, voltage 227, is simultaneously applied to AND gates 50 and 51. At the same time, the pulse train out of data rate programmer 47 is also applied to AND gates 50 and 51. It will be remembered that several different pulse trains, each having a different pulse repetition frequency and, therefore, each associated with a different data rate, may be produced by programmer 47. It will also be remembered that pulse train 200 in FIG. 4*b* was selected for purposes of discussion. Accordingly, it is the pulses of pulse train 200 that are applied to AND gates 50 and 51 at the same time as voltage 227.

Furthermore, by tracing the circuit connections between flip-flop circuit 41 and AND gates 50 and 51, it will be seen that step voltage 220 produced at one output terminal of the flip-flop is applied to gate 50 and step voltage 218 produced at the other output terminal of the flip-flop is applied to gate 51.

As is well known by those skilled in the art and, therefore, familiar with the operation of AND gates, the pulses of pulse train 200 are passed through gate 50 only when step voltages 220 and 227 are simultaneously in a "1" or "plus" condition. Consequently, for the interval of data sample 221, the pulses of pulse train 200 are passed through gate 50 to binary scaler 76, that is, the pulses are passed through for the period of time in which voltage 227 is in a "1" condition during the interval of data sample 221. This is clearly shown in the figure, the pulses applied to binary scaler 76 being designated 228. Similarly, for the interval of data sample 222, the pulses of pulse train 200 are passed through gate 51 to binary scaler 77 from the beginning of this interval until the point in time corresponding to point of intersection 226 or, stated differently, for the period of time in which voltage 227 is in a "1" condition during the interval of data sample 222. The pulses thereby applied to scaler 77 are designated 230. It will be noticed that since flip-flop voltages 218 and 220 are complements of each other, binary scalers 76 and 77 are operated alternately, one unit operating out of phase with the other.

As mentioned, during data sample 221, pulses 228 are applied to binary scaler 76 and, in response thereto, the five stages of the scaler respectively produce pulses 231 to 235, pulses 231 being produced by the $A_3$ stage, pulses 232 being produced by the $B_3$ stage, etc., pulses 235 being produced by stage $E_3$. Similarly, during data sample 222, pulses 230 are applied to binary scaler 77 and, in response thereto, the five stages of this scaler respectively produce pulses 236 to 240, pulses 236 being produced by the $A_4$ stage, pulses 237 being produced by the $B_4$ stage, etc., pulse 240 being produced by stage $E_4$. It should be noted that pulses 231 to 235 remain at whichever voltage level they may be at the instant of time corresponding to point of intersection 225 and that pulses 236 to 240 likewise remain at what ever voltage level they may be at the instant of time corresponding to point of intersection 226. It should further be noted that these voltage levels remain constant until scalers 76 and 77 are reset so that all their stages are again in a "0" or "minus" condition.

The resetting of scalers 76 and 77 occurs when voltages 218 and 220 out of flip-flop 41 increase from a "minus" to a "plus" condition, that is, at the rising edges of these voltages. By tracing the connections through, it will be seen that voltage 220 is applied to shaping circuit 72 and voltage 218 is applied to shaping circuit 73. These circuits respectively differentiate and appropriately gate the above-mentioned voltages applied to them so that positive voltage spikes 241 and 242 are produced at those times when they experience the aforesaid voltage level change overs. Voltage spikes 241 are applied to binary scaler 76 and, similarly, voltage spikes 242 are applied to binary scaler 77, the scalers thereby being reset by them.

Before being reset, however, stages $A_3$ to $E_3$ of binary scaler 76 respectively apply their output signals via lines 78 to 82 to AND gates 88, 90, 92, 94 and 96 in FIG. 2*b*. Similarly, stages $A_4$ to $E_4$ of binary scaler 77, in their turn, respectively apply their output signals via lines 83 to 87 to AND gates 89, 91, 93, 95 and 97. In addition, flip-flop voltage 218 is applied via line 44 to AND gates 88, 90, 92, 94 and 96 and flip-flop voltage 220 is applied via line 43 to AND gates 89, 91, 93, 95 and 97. Finally, AND gates 88 to 95 receive pulse trains 204 to 207 respectively produced by stages $B_2$ to $E_2$ of binary scaler 48 in FIG. 2*a*, pulse train 204 being applied via line 64 to gates 88 and 89, pulse train 205 being applied via line 63 to gates 90 and 91, pulse train 206 being applied via line 62 to gates 92 and 93, and pulse train 207 being applied via line 61 to gates 94 and 95.

It will be remembered that in accordance with AND gate theory, the AND gates used herein will not produce an output signal unless the two or more signals simultaneously applied to them are in a "plus" condition. Accordingly, an examination of the above-cited voltage waveforms applied to AND gates 88 to 97 will at once indicate that gates 88, 90, 92, 94 and 96 can only produce voltage waveforms 243 to 247 and gates 89, 91, 93, 95 and 97 can only produce voltage waveforms 248 to 252. It should be noted that waveforms 243 to 247 can only occur during the period of data sample 222 due to the fact that flip-flop voltage 218 is in a "minus" condition for the duration of data sample 221 and is in a "plus" condition only during the former period. For similar reasons, waveforms 248 to 252 can only occur during the period of data sample 221. Mention should further be made of the fact that gates 89, 91, 92, 93 and 94 produce no output (see waveforms 245, 246, 248, 249 and 250), the reason being that no signals are applied to these gates (see waveforms 233, 234, 236, 237 and 238) at the times under consideration.

As they occur, voltage waveforms 243 to 252 are applied to half-adders 109 to 112 in the manner shown in FIG. 2*b*, the half-adders combining these waveforms to ultimately produce voltage waveforms 253 and 254 out of half-adder 112. Whether the bauds or pulse positions of waveforms 253 and 254 are in a "plus" or "minus" condition are indicated above the waveforms by the use of a "1" or a "0," respectively. As shown, waveform 253 takes the code form: 0000000011111111, whereas waveform 254 takes the code form: 1001100110011001, both forms being in accordance with the basic sixteen digit Reed-Muller coding scheme adopted for the present invention.

Voltage waveforms 253 and 254 are successively passed through gate 114 to one input terminal of half-adder 113, voltage waveform 214 of FIG. 4*e*, representing the synchronizing code, being applied to the other input terminal of half-adder 113. Half-adder 113 additively combines voltage waveform 214 with voltage waveforms 253 and 254 to produce new voltage waveforms 255 and 256. Here again, whether the bauds or pulse positions of waveforms 255 and 256 are in a "plus" or "minus" condition are indicated above the waveforms by a "1" or "0," respectively. As shown, waveform 255 takes the code form: 0001110010110110, whereas waveform 256 takes the code form: 1000010111010000, both of these forms being Reed-Muller codes slightly modified for the embodiment of the present invention.

In succession, voltage waveforms 255 and 256 are passed through gate 115 and the selected one of filters 116*a*–116*n* to modulator 117 wherein they modulate the carrier being applied to the modulator by crystal oscillator 118. The modulated carrier is then amplified by power amplifier 119 and thereafter radiated into space by antenna 120. It is thus seen how two data samples are respectively converted to pulse coded signals and that these signals are transmitted as modulation on a carrier. Still other data samples are subjected to this technique as determined by the length of the data transmission period. Following data transmission, the unmodulated carrier and the synchronizing code are once again transmitted in the order delineated. Thus, the cycle repeats itself until the entire system is shut off.

Considering the modulation employed in somewhat greater detail, the carrier applied to modulator 118 is subjected to a form of phase modulation in which the carrier is made to have one phase or another to represent the "plus" or "minus" conditions, respectively, of the modulating signals applied to the modulator, such as voltage waveforms 255 and 256. More specifically, using the unmodulated carrier as a reference, the carrier is shifted in phase by substantially 90° in one direction when a "plus" occurrs and in an opposite direction when a "minus" occurs so that "plus" and "minus" portions of the modulated carrier are substantially 180° out of phase with each other.

It should be recognized that the phase modulation used herein is merly a preferred form of modulation and that other types of modulation may be used as well. Thus, for example, conventional pulse code modulation may be used in which the carrier is transmitted for the duration of a "plus" condition and is not transmitted during a "minus" condition. Another example is frequency-shift modulation in which the carrier frequency is shifted to first and second new values to respectively represent "plus" and "minus" intervals. As stated above, still other forms of modulation are available.

Having completed a description of the operation of the airborne system, attention is now directed to the operation of the ground system and for this purpose reference is made to FIGS. 3*a* and 3*b* wherein the ground system is shown. Furthermore, the sequence in which the ground system operation will be described will be the same as that in which the airborne system operation was described. Accordingly, the operation in connection with carrier, synch code and data reception will be taken up for discussion in that order.

The unmodulated carrier transmission is received by antenna 121 and passed therefrom to receiver 122 which is tuned to the carrier frequency. In a conventional manner, the receiver amplifies the received signal, reduces the interfering effects of noise, converts the received carrier to an I.F. carrier, etc. After being processed by the receiver, the carrier is passed via line 125 to one input to phase detector 124, a signal at the carrier frequency being applied by voltage controlled oscillator 127 to the other input to phase detector 124. As is well known, the phase detector circuit produces a voltage whose amplitude and sense vary according to the difference in phase betwen the signals applied to the circuit. Accordingly, in the event that a phase difference exists between the I.F. carrier and the signal out of oscillator 127, and a phase difference is apt to exist, a correcting voltage is applied to junction point 135 which passes through filter 133 to voltage controlled oscillator 127. As the name of the oscillator implies, the correcting voltage causes the phase of the oscillator signal to change until it is "locked" to that of the carrier signal, at which time the correcting voltage is reduced to zero. For this reason, the combination of phase detector 124, filter 133 and voltage controlled oscillator 127 is oftentimes referred to as a phase-lock loop.

Considering filters 133 and 134 in somewhat greater detail, switch 132 varies the bandwidth of the phase-lock loop by connecting one or the other of these filters into the loop as needed. More specifically, during the aquisition phase or, stated differently, during the "carrier lock" mode of operation, the airborne system transmits a carrier signal only for a relatively short period of time. Furthermore, since there is no modulation at this time, the amount of carrier power is considerably larger than during subsequent transmitting periods. Accordingly, to allow faster search and lock, switch 132 initially connects filter 133 into the loop in order to provide a wider bandwidth. However, as will be seen shortly, once the carrier is acquired, the switch substitutes filter 134 for filter 133, thereby narrowing the tracking bandwidth in preparation for modulated carrier reception, a condition during which most of the transmitted energy is contained in the carrier sidebands.

Returning now to line 125, the carrier signal on this line is applied to one input to phase detector 123, the other input of this detector receiving the signal produced by oscillator 127 after the signal has first passed through 90° phase shifter 126. It will be obvious to those skilled in the electronic arts that by shifting the phase of the oscillator signal by 90°, a direct-current voltage of maximum amplitude is applied to integrating circuit 128. In response to this voltage, integrating circuit 128 produces an exponentially increasing voltage that is applied to comparing amplifier 130 and when this increasing voltage exceeds the bias voltage on the amplifier, the amplifier applies a pulse to switch 132 which activates the latter to disconnect filter 133 from the loop circuit and connect in filter 134 instead, as previously mentioned.

Having thus described the purpose in periodically transmitting an unmodulated carrier and the operation of the ground system upon receipt of this signal, consideration will now be given to the significance of the synch code signal and the operation of the ground system upon its receipt.

In addition to activating switch 132, the pulse out of amplifier 130 is also applied to delay multivibrator 131 and, in consequence thereof, the multivibrator produces a delayed pulse that is of sufficient duration to include the synch code period. This delayed pulse is applied by multivibrator 131 to gate 158 which, in response thereto, is gated on for the synch code period to pass signals out of phase detector 160. The purpose of so doing will be more clearly understood later.

When the synch code signal is received by antenna 121, it is successively passed therefrom through receiver 122 and phase detector 124 to data filters $136_a$ to $136_n$ whereat, in passing through the filter selected in accordance with the data rate being used, the original sequence of pulses constituting the synch code signal is obtained. Thus, at the output of the appropriate filter, voltage waveform 214 in FIG. 4*e* is reproduced. This waveform is applied to balanced modulator 138. Also applied to modulator 138 is a local carrier signal produced by carrier generator 140, the carrier frequency being adjusted to provide a time period between successive zero crossings equal to an even submultiple of the delay time between adjacent taps or coils on the delay line. In response to both signals, a two-phase carrier signal is produced by balanced modulator 138, one phase representingg a "1" or "plus" condition and the other phase representing a "0" or "minus" condition of the synch code signal. Preferably the two phases differ from each other by 180°.

The carrier as modulated by the synch code waveform is applied to delay line 142 and propagated down it. When complete correlation exists between the input code group and its matched decoder matrix of coils to busses, then a maximum signal will appear at the associated differential amplifier. In the present instance, the data rate selected for discussion purposes was that produced by oscillator 45 in FIG. 2*a*, which is the maximum data rate. Accordingly, coils $144_1$ to $144_{16}$ are in the circuit and when the 16 digits of the synch code modulated carrier signal are in alignment with these 16 coils, the portions of the carrier having one phase are simultaneously applied to buss $146_1$ and the remaining portions of the carrier having the other phase are simultaneously applied to buss $146_2$. The signals on these two busses are applied to difference amplifier $147_1$ wherein one signal is inverted before being amplified, thereby causing a maximum signal to be produced by the difference amplifier.

The signal out of difference amplifier $147_1$ is applied via line $148_1$ to phase detector $166_1$ in FIG. 3*a* to which is also applied the carrier signal generated by carrier generator 140, this latter signal being phase inverted first by phase inverter 167 before applied to the phase detector. The carrier signal is applied to inverter 167 via line 165. In response to the two signals applied to it, phase detector $166_1$ produces an output voltage illustrated by waveform 260 in FIG. 6 and a comparison of this voltage with voltage pattern 215 in FIG. 4*e* will indicate that they are the same. It will be remembered that it was previously mentioned that voltage pattern 215 was the auto-correlation function associated with synchronizing code 214 of FIG. 4*e*.

Signal 260 is applied to one input to phase detector 160, the other input to the phase detector receiving a square-wave oscillation 261 produced by voltage controlled oscillator 162. Only one cycle of the square-wave oscillation is shown, however, in FIG. 6. With respect to this oscillation it should be mentioned that its period, that is, the time for one of its cycles, is equal to that of a 16 digit code period. It should be mentioned further that initially the lagging edge of signal 261 is not coincident with axis of symmetry 262 of signal 260 and that the object during the synch code interval is to bring them into coincidence. Axis of symmetry 262, it will be seen, is also the center-line for the largest pulse in signal 260, this pulse being designated 263.

Upon receipt of signals 260 and 261, phase detector 160 applies a signal 264 to gate 158 and, since the gate has been gated On by delay multivibrator 131, the gate passes this same signal to filter 161. It will be noticed that during the positive or first half of signal 261, signal 264 is identical with signal 260 whereas during the negative or last half of signal 261, signal 264 is signal 260 inverted. Consequently, the voltage produced by filter 161 is either positive or negative depending upon whether or not pulse 263 is inverted. Whether or not pulse 263 is inverted is determined by the position of the pulse relative to the lagging edge of waveform 261. In the present instance, the voltage produced by filter 161, designated 265, is basically a negative voltage, as shown in the figure. This voltage 265 is applied to voltage controlled oscillator 162 and, as a result, the phase of square-wave oscillation 261 is shifted until its lagging edge is substantially coincident with axis of symmetry 262 of signal waveform 260. For the purpose of illustrating this point, axis of symmetry 262 and pulse 263 of signal 260 as well as signal 261 are reproduced. It will be obvious that the voltage out of filter 161 is reduced to zero when the desired coincidence is achieved so that the phase of signal 261 is no longer shifted and the described coincidence is thereafter maintained.

Now that synchronization has been achieved, the lagging edges of future cycles of oscillation 261 may be used effectively for decoding purposes. Accordingly, oscillation 261 is applied to shaping circuits 163 wherein each cycle of the oscillatory signal is differentiated, gated, etc., to produce a rectangular pulse 266 which coincides in time with the lagging edge of that cycle. These pulses 266 are applied via line 164 to "greatest of" detector 168 in FIG. 3*a* which is thereby enabled for the duration of each pulse to simultaneously compare the outputs of all phase detectors $166_1$ to $166_{32}$ during the data transmission period which will now be considered.

In describing the operation of the ground system during the data transmission period, only the receipt of coded data samples 221 and 222 shown in FIG. 5*b* will be considered. Accordingly, the carrier modulated by pulse waveforms 255 and 256, previously described when the operation of the airborne system was described, is received by antenna 121 and passed therefrom through receiver 122, phase detector 124 and the selected one of data filters **136*a* to 136*n*. As a result, signals 255 and 256 are reproduced at the input to balanced modulator 138. In the same manner as did the synch code signal, signals 255 and 256 successively modulate the local carrier applied to modulator 138 by carrier generator 140**, the carrier being caused, as before, to have one phase for a "1" condition and an opposite phase for a "0" condition.

The local carrier, as modulated by waveforms 255 and 256, is propagated down delay line 142 until the portion of the carrier modulated by signal 255 is in alignment with coils $144_1$ to $144_{16}$. When this occurs, signals of one phase or the other, or both, will appear on busses $146_1$ to $146_{32}$ so that signals of different magnitude will respectively be produced by difference amplifiers $147_1$ to $147_{16}$. The reason for the different magnitudes of the amplifier outputs was previously explained in connection with the synch code signal, namely, only at one pair of busses are the signals all of one phase on one buss and all of the other phase on the other buss. On all other busses, the signals thereon are of both phases with the result that signal cancellation takes place, thereby reducing the carrier output of the associated difference amplifiers.

Difference amplifiers $147_1$ to $147_{16}$ respectively apply their carrier outputs of varying amplitude to phase detectors $166_1$ to $166_{32}$, the output from each amplifier being applied to a pair of detectors. Thus, the output from difference amplifier $147_1$ is applied via line $148_1$ to phase detectors $166_1$ and $166_2$, the output from difference amplifier $147_2$ is applied via line $148_2$ to phase detectors $166_3$ and $166_4$, etc., the output from difference amplifier $147_{16}$ being applied via line $148_{16}$ to phase detectors $166_{31}$ and $166_{32}$. In addition, one of each pair of phase detectors is driven by the in-phase component of the carrier out of carrier generator 140 while the other phase detector is driven by the 180° out-of-phase component. In FIG. 3*a*, the in-phase component is applied to all the odd-numbered phase detectors, such as $166_1$, $166_3$, etc., whereas the 180° out-of-phase component is applied to all the even-numbered phase detectors, such as $166_2$, $166_4$, etc. The 180° out-of-phase component is obtained by first passing the carrier through phase inverter 167 before applying it to the detectors. From what has been said it will be obvious to one skilled in the art that the output from only one of the phase detectors will have a large positive value while the remaining outputs are near zero or even negative, the detector having the large output being the one associated with coded signal 255.

Figure 6:
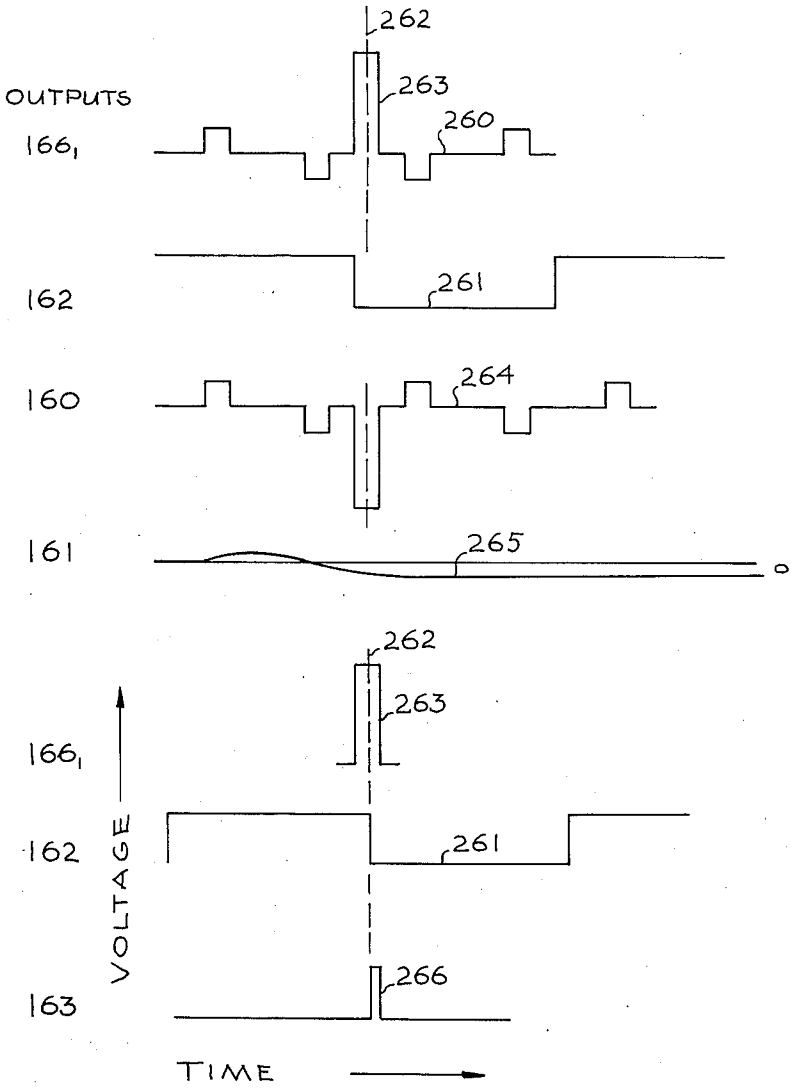

The thirty-two outputs from phase detectors $166_1$ to $166_{32}$ are respectively applied to transistors $170_1$ to $170_{32}$ in "greatest of" detector 168. At the same time, enabling pulse 266 of FIG. 6 is applied to transistor 173 therein, thereby allowing transistors $170_1$ to $170_{32}$ to compare the amplitudes of the phase detector outputs and, in essence, select the output having the largest amplitude. The action of transistors $170_1$ to $170_{32}$ is such that current will flow through resistor 172 from only one of these transistors, that being the one with the greatest input voltage. All other transistors are back-biased by the voltage drop across resistor 172 due to current flow through the one transistor which has had the greatest voltage generated in its input circuit.

Current flow through the one of the thirty-two possible transistor paths identifies the correct voltage level or value of the data sample, namely, data sample 221 of FIG. 5*b* in the present instance. More specifically, of the thirty-two voltage levels utilized in the system (see staircase voltage 217), the voltage level associated with data sample 221 is produced across the load resistor (one of resistors $171_1$ to $171_{32}$) of the sole current conducting transistor and this voltage level is applied to digital-to-analog converter 176. From it, digital-to-analog converter 176 reproduces the analog sample 221 taken at the input terminals of commutator 25 in the airborne system. This analog sample is then applied to decommutator 175 which, under the control of synchronizing pulses 266, passes the sample to the correct one of output terminals 178, 179 and 180. Synchronizing pulses 266 successively trigger decommutator 175 so that output terminals 178, 179 and 180 are connected in rotation to the output end of digital-to-analog converter 176. Before each data transmission period, the synch code signal causes a reset pulse to be applied to decommutator 175 so that the decommutator will start its cycle with the same output terminal during each data transmission period. In this way a correct correspondence is maintained between the input terminals of commutator 25 and the output terminals of decommutator 175.

Having described the evolution of signal waveform 255, attention is now directed to signal wave form 256 which follows waveform 255. However, a detailed description with respect to the waveform 256 is deemed unnecessary in view of the fact that the processing of waveform 256 is substantially identical to that of waveform 255. Suffice it to say, therefore, that from waveform 256, a voltage level associated with data sample 222 is applied to digital-to-analog converter 176 which, in the same manner as heretofore described, reproduces analog sample 223. This analog sample is then applied to the next one of output terminals 178, 179 and 180 that happen to be connected to the output of digital-to-analog converter 176.

In the same manner that these two analog samples were produced at output terminals 178, 179 and 180, so are the remaining analog or data samples transmitted in coded form during the data transmission period ultimately produced at the appropriate output terminals.

The embodiment shown was described using a data rate determined by crystal oscillator 45 of FIG. 2*a*. It should be mentioned that other data rates may be used as determined by scaler 46 but that the basic operation will remain the same. It should further be mentioned that although the system herein is designed for an accuracy corresponding to 32 quantized levels, the system is nevertheless capable of being extended to 256 levels or even further by adding modules identical to those provided as shown and described. Moreover, it can be decreased by deleting modules. The resulting flexibility which is built into the system permits a great variety of multiplexing arrangements for specific missions so that transmission accuracy can be matched to transducer accuracy.

Additionally, it should be mentioned that although the airborne system shown in FIGS. 2*a* and 2*b* was designed for the reception of analog signals at the inputs of commutator 25, with slight modification the airborne system may be utilized also for the reception of binary coded information. The manner in which the airborne system may be modified to accommodate binary coded signals rather than analog signals is shown in FIG. 7 wherein only the modified portion of the airborne system is shown. Thus, aside from the changes indicated in FIG. 7, the rest of the airborne system is as previously illustrated. Furthermore, wherever possible the same numerals will be used to designate elements in FIG. 7 as were used in FIG. 2*a*. Thus, binary scalers 76 and 77 in FIG. 2*a* are also designated 76 and 77 in FIG. 7. Similarly, the commutator and its output line as well as the flip-flop are respectively designated 25, 30 and 41, just as they were in FIG. 2*a*.

Considering now FIG. 7, three sets of five AND gates each, generally designated 300, 301 and 302, are connected to the three output terminals of commutator 25. More particularly, the output terminals of the commutator are respectively designated 303, 304 and 305 with output terminal 303 connected to all five AND gates of set 300, output terminal 304 connected to all five AND gates of set 301, and output terminal 305 connected to all five AND gates of set 302. Three sets of five input terminals each, generally designated 306, 307 and 308, are also respectively connected to the three sets of AND gates. More specifically, the five input terminals of set 306 are respectively connected to the five AND gates of set 300, the five input terminals of set 307 are respectively connected to the five AND gates of set 301, and the five input terminals of set 308 are respectively connected to the five AND gates of set 302.

As for the output connections of AND gate sets 300, 301 and 302, the output terminals of sets 300 and 302 are connected to binary scaler 76 whereas the output terminals of set 301 are connected to binary scaler 77. Hence, as shown in the figure, the input to stage $A_3$ is connected to the output terminals of the first AND gates of sets 300 and 302, the input to stage $B_3$ is connected to the output terminals of the second AND gates of sets 300 and 302, etc., the input to stage $E_3$ being connected to the output terminals of the last and fifth AND gates of sets 300 and 302. In the same manner, the inputs to the five stages of scaler 77, namely, stages $A_4$, $B_4$, $C_4$, $D_4$ and $E_4$, are respectively connected to the output terminals of the five AND gates of set 301. Should there be more than three sets of input terminals and associated sets of AND gates, the output connections of these sets would nevertheless be the same, that is, alternate sets of AND gates would be connected in parallel to one binary scaler and the remaining sets of AND gates would be connected in parallel to the other binary scaler. Stated differently, all odd sets of AND gates would be connected to one binary scaler and all even sets of AND gates would be connected to the other binary scaler.

Finally, line 31 in FIG. 2*a* is deleted completely and line 30, in addition to its other shown connections, is now also connected to flip-flop 41, as indicated in FIG. 7. As previously mentioned, all other units and connections in the airborne system are as shown in FIGS. 2*a* and 2*b* and, therefore, need not be described in detail again.

In operation, a five digit binary-coded data signal is applied in parallel to input terminals 306. At the same time that this signal is applied, a pulse is applied to AND gate set 300 via commutator output terminal 303. As a result, the binary-coded signal is passed to binary scaler 76 whereat the signal is applied in parallel to the five stages of the scaler. In consequence thereof, stages $A_3$, $B_3$, $C_3$, $D_3$ and $E_3$ simultaneously produce output pulses of the type previously shown and discussed (see waveforms 231 to 235 in FIG. 5'*b*). These output pulses are applied to other parts of the airborne system (see FIGS. 2*a* and 2*b*) from which there is ultimately produced a carrier modulated by Reed-Muller coded signals representing the data signal.

The operation is basically the same with respect to data signals applied in parallel to input terminals 307, with the exception that here the signals are passed to binary scaler 77 instead. Thus, upon activation of AND gate set 301 by a pulse from commutator output terminal 304, the binary-coded signal applied to terminals 307 are passed through AND gates 301 to binary scaler 77. Upon being triggered, stages $A_4$, $B_4$, $C_4$, $D_4$ and $E_4$ simultaneously produce pulses (see waveforms 236 to 240) that also lead to the generation of a carrier that is modulated by Reed-Muller coded signals.

Once the various stages of binary scaler 76 have been triggered as described above and reset, they become available for still another data signal. Accordingly, when a binary coded data signal is applied in parallel to input terminals 308, it is passed once again to binary scaler 76. Thus, the data signals are alternately passed to scalers 76 and 77 as they become available. For resetting binary scalers 76 and 77, a reset pulse is applied to flip-flop 41 from commutator line 30. By tracing the connections of the flip-flop circuit in FIGS. 2*a* and 2*b*, it will be seen how the reset pulses applied to flip-flop 41 ultimately affect binary scalers 76 and 77.

With respect to the handling of binary-coded signals, it will be recognized that the airborne system as modified in FIG. 7 may also be utilized where the digitalized data is applied sequentially rather than in parallel and this may be accomplished by appropriately inserting a shift register.

One additional fact should be noted about the system as a whole, namely, that coding schemes other than the maximum redundancy Reed-Muller code may be used with equally good effect. One such other coding scheme that is considered equivalent to the Reed-Muller code is referred to as maximal length shift register sequences and is described in an article entitled "An Error-Correcting Encoder and Decoder" by J. H. Green, Jr. and R. L. San Soucie, published in the October 1958 issue of the Proceedings of the I.R.E., pages 1741–1744.

Finally, it should be emphasized that the stated advantages and improvements can be realized at existing telemetry ground stations without extensive modification or obsolescence of equipment. With the exception of the demodulation circuitry, the present system can utilize nearly all of the receiving equipment of existing or contemplated ground installations.

Having thus described the invention, what is claimed as new is:

1. A telemetry system for communicating data applied to the system in the form of analog voltages, said system comprising: first means for periodically sampling the analog voltages; second means coupled to said first means and operable in response to the plurality of voltage samples received therefrom to produce a corresponding plurality of digitalized signals coded to respectively represent said samples, the code selected for each digitalized signal being determined by the amplitude of the corresponding voltage sample, said second means including additional means for comparing each voltage sample with a predetermined number of different voltage levels to determine the amplitude of each sample, and an arrangement of binary scalers, AND gates and one-half adders coupled to said additional means for producing the coded signal for each sample; third means having an oscillator therein for generating a carrier signal, said third means being coupled to said second means to receive said coded digitalized signals therefrom, said third means including further means for transmitting said carrier signal modulated by said coded digitalized signals; fourth means for receiving the modulated carrier transmitted by said third means; a plurality of correlation detectors coupled to said fourth means in such a manner as to simultaneously receive each code modulated portion of said carrier that represents a voltage sample, said plurality of detectors being operable in response to each such carrier portion to simultaneously produce a corresponding plurality of output signals of varying amplitude, the output signal of maximum amplitude being produced by the one detector whereat the greatest carrier signal correlation exists; and output means including a network coupled to said correlation detectors for simultaneously comparing the amplitudes of said output signals to identify the detector producing the maximum output signal thereby to identify the amplitude of the associated sample, said output means further including conversion means coupled to said network and responsive to the identification made therein to reproduce the analog signal corresponding to the modulation on the portion of the carrier received by said correlation detectors.

2. In a telemetry system for communicating data applied to the system in the form of analog voltages, a transmitter comprising: first means for periodically sampling the analog voltages; second means coupled to said first means and operable in response to the plurality of voltage samples received therefrom to produce a corresponding plurality of digitalized signals binary coded to respectively represent said samples, the code selected for each digitalized signal being determined by the amplitude of the corresponding voltage sample, said second means including additional means for comparing each voltage sample with a predetermined number of different voltage levels to determine the amplitude of each sample and further including an arrangement of binary scalers, AND gates and one-half adders coupled to said additional means for producing the coded signal for each sample; and third means having an oscillator therein for generating a carrier signal, said third means being coupled to said second means to receive said coded digitalized signals therefrom, said third means including further means for transmitting said carrier signal modulated by said coded digitalized signals.

3. In a telemetry system wherein analog voltages applied to the system are transmitted as a carrier modulated by digitalized signals coded in accordance with binary coding techniques, a receiver comprising: means for receiving the modulated carrier; a plurality of correlation detectors coupled to said means in such a manner as to simultaneously receive each code modulated portion of the carrier that represents a voltage sample, said plurality of detectors being operable in response to each such carrier portion to simultaneously produce a corresponding plurality of output signals of varying amplitude, the detector whereat there is the greatest carrier signal correlation producing the output signal of maximum amplitude; and output means including a network coupled to said correlation detectors for simultaneously comparing the amplitudes of said output signals to identify the detector producing the maximum output signal thereby to identify the amplitude of the associated sample, said output means further including conversion means coupled to said network and responsive to the identification made therein to reproduce the analog signal corresponding to the modulation on the portion of the carrier received by said correlation detectors.

4. A telemetry system for communicating data applied to the system in the form of analog voltages, said system comprising: first means for periodically sampling the analog voltages; second means coupled to said first means and operable in response to the plurality of voltage samples received therefrom to produce a corresponding plurality of binary coded signals coded in accordance with the Reed-Muller codes to respectively represent said samples; third means coupled to said first and second means for selectively varying the sampling and binary digit rates to selectively vary the rates at which data is communicated; and transmitter apparatus coupled to said second means for transmitting a carrier signal successively modulated by said plurality of binary coded signals; receiver apparatus for receiving the modulated carrier transmitted by said transmitter apparatus; a single delay line coupled at one end to said receiver apparatus to sequentially receive the coded portions of said modulated carrier and having a plurality of taps variably spaced therealong according to the various digit rates in order to simultaneously produce each of said coded portions irrespective of the rate at which data is communicated; a decoding matrix including a plurality of matched filter networks respectively coupled to said plurality of delay line taps, the filter networks coupled to the taps whereat a portion of the carrier is produced being operable in response thereto to respectively produce output signals of varying amplitude, the output signal of maximum amplitude being produced by the filter network whereat the greatest match exists between the modulated carrier and the elements of the filter networks; and output means coupled to said decoding matrix for simultaneously comparing the amplitudes of said output signals to identify the filter network producing the maximum output signal, said output means including additional means responsive to an identification for reproducing the analog signal corresponding to the modulation on the portion of the carrier applied to said matched filter networks.

5. In a telemetry system for communicating data applied to the system in the form of analog voltages, a transmitter comprising: first means for periodically sampling the analog voltages; second means coupled to said first means and operable in response to the plurality of voltage samples received therefrom to produce a corresponding plurality of binary coded signals coded in accordance with the Reed-Muller codes to respectively represent said samples; third means coupled to said first and second means for selectively varying the sampling and the binary digit rates to selectively vary the rates at which data is communicated, respectively; and transmitter apparatus coupled to said second means for transmitting a carrier signal successively modulated by said plurality of binary coded signals.

6. In a telemetry system wherein analog voltages applied to the system are transmitted as a carrier modulated by binary coded signals coded in accordance with Reed-Muller codes, the binary coded signals being generated at a selected one of several binary digit rates, a receiver comprising: means for receiving the modulated carrier; a single delay line coupled at one end to said means to sequentially receive the coded portions of said modulated carrier and having a plurality of taps variably spaced therealong in accordance with the various digit rates in order to simultaneously produce each coded portion of the modulated carrier irrespective of the rate at which data is communicated; a decoding matrix including a plurality of matched filter networks respectively coupled to said plurality of delay line taps, the filter networks coupled to the taps whereat a portion of the carrier is produced being operable in response thereto to respectively produce output signals of varying amplitude, the output signal of maximum amplitude being produced by the filter network whereat the greatest match exists between the modulated carrier portion and the elements of the filter network; a detector network coupled to said decoding matrix for simultaneously comparing the amplitudes of said output signals to identify the filter network producing the maximum output signal; and Digital-to-Analog output means coupled to said detector network and responsive to the identification made therein to reproduce the analog signal corresponding to the modulation on the portion of the carrier applied to said matched filter networks.

7. A telemetry system for communicating data applied to the system in the form of analog voltages, said system comprising: means for periodically sampling the analog voltages; an analog-to-digital converter coupled to said means for digitalizing each voltage sample according to the amplitude thereof said digitalization consisting of generating a binary coded signal representing the amplitude of each voltage sample in accordance with a first binary coding scheme; code generator apparatus coupled to said analog-to-digital converter and operable in response to each binary coded signal therefrom to generate another binary coded signal representing the amplitude of each voltage sample in accordance with a second binary coding scheme; transmitter apparatus including an oscillator for generating a carrier signal and a modulator coupled to said oscillator and said code generator for modulating said carrier signal with said second binary codes, said apparatus transmitting said modulated carrier signal; means for receiving said modulated carrier; a plurality of correlation detectors coupled to said last-named means in such a manner as to simultaneously receive each code modulated portion of said carrier each correlation detector being adapted to provide maximum correlation only with a signal encoded in a respective one of said second binary codes, said plurality of detectors being operable in response to each such carrier portion to simultaneously produce a corresponding plurality of output signals of varying amplitude, the output signal of maximum amplitude being produced by the one detector whereat the greatest carrier signal correlation exists; a "greatest of" detector connected to said plurality of correlation detectors, said "greatest of" detector being periodically activated to simultaneously compare the amplitudes of said output signals to identify the correlation detector producing the maximum output signal, said "greatest of" detector identifying said correlation detector by producing a recognition voltage at a level corresponding to the detector identified; a synch generator connected between said correlation detectors and said "greatest of" detector, said synch generator being operable in response to the first output signal of maximum amplitude to periodically generate a synchronizing pulse for activating said "greatest of" detector coincidentally with the occurrence of said output signals; and output means connected to said "greatest of" detector and operable in response to each recognition voltage to reproduce the analog signal associated with the portion of the modulated carrier received by said correlation detectors.

8. In a telemetry system for communicating data applied to the system in the form of analog voltages, a transmitter comprising: means for periodically sampling the analog voltages; an analog-to-digital converter coupled to said means for quantizing each voltage sample according to the amplitude thereof; a Reed-Muller code generator coupled to said analog-to-digital converter and operable in response to each quantized signal therefrom to generate a Reed-Muller code corresponding to the applied quantized signal; and a transmitter apparatus including an oscillator for generating a carrier signal and a modulator coupled to said oscillator and said code generator for modulating said carrier signal with said Reed-Muller codes, said apparatus transmitting said modulated carrier signal.

9. In a telemetry system wherein analog voltages applied to the system are transmitted as a carrier successively modulated by Reed-Muller codes, a receiver comprising: means for receiving said modulated carrier; a plurality of correlation detectors coupled to said last-named means in such a manner as to simultaneously receive each code modulated portion of said carrier each correlation detector being adapted to provide maximum correlation only with a signal encoded in a respective one of said Reed-Muller codes, said plurality of detectors being operable in response to each such carrier portion to simultaneously produce a corresponding plurality of output signals of varying amplitude, the output signal of maximum amplitude being produced by the one detector whereat the greatest carrier signal correlation exists; a "greatest of" detector connected to said plurality of correlation detectors, said "greatest of" detector being periodically activated to simultaneously compare the amplitudes of said ouput signals to identify the correlation detector producing the maximum output signal, said "greatest of" detector identifying said correlation detector by producing a recognition voltage at a level corresponding to the detector identified; a synch generator connected between said correlation detectors and said "greatest of" detector, said synch generator being operable in response to the first output signal of maximum amplitude to periodically generate a synchronizing pulse for activating said "greatest of" detector coincidentally with the occurrence of said output signals; and output means connected to said "greatest of" detector and operable in response to each recognition voltage to reproduce the analog signal associated with the portion of the modulated carrier received by said correlation detectors.

10. A telemetry system for communicating data applied to the system in the form of analog voltages, said system comprising: commutator apparatus for periodically sampling the analog voltages; an analog-to-digital converter coupled to said commutator apparatus for respectively producing a plurality of binary coded signals in response to said plurality of voltage samples, the particular binary coded signal produced being determined by the voltage level of the corresponding voltage sample; a Reed-Muller code generator coupled to said analog-to-digital converter and operable in response to said plurality of binary coded signals to produce a corresponding plurality of Reed-Muller coded signals, the particular Reed-Muller coded signal produced being determined by the code of the corresponding binary coded signal; transmitter apparatus including an oscillator for generating a carrier signal and a modulator coupled to said oscillator and said code generator for modulating said carrier signal with said Reed-Muller coded signals, said apparatus transmitting said modulated carrier signal; means coupled to said commutator apparatus and to said analog-to-digital converter for selectively varying the sampling and binary digit rates, respectively; receiver apparatus for receiving the modulated carrier transmitted by said transmitter apparatus; a delay line coupled to said receiver apparatus and having a plurality of taps variably spaced therealong in accordance with the various digit rates to simultaneously produce each coded portion of said modulated carrier; a decoding matrix including a plurality of matched filter networks respectively coupled to said plurality of delay line taps, the filter networks coupled to the taps whereat a modulated portion of the carrier is produced being operable in response thereto to simultaneously produce output signals of varying amplitude, the output signal of maximum amplitude being produced by the filter networks whereat the greatest match exists between the modulated carrier and the elements of the filter network; a "greatest of" detector connected to said plurality of filter networks, said detector being periodically activated to simultaneously compare the amplitudes of said output signals to identify the matched filter network producing the maximum output signal, said detector identifying said filter network by producing a recognition voltage whose level corresponds to the network identified; a synch generator connected between said matched filter networks and said "greatest of" detector, said synch generator being operable in response to the first output signal of maximum amplitude to periodically generate a synchronizing pulse for activating said detector coincidentally with the occurrence of said output signals; and conversion means connected to said "greatest of" detector and operable in response to each recognition voltage to reproduce the analog voltage associated with the portion of the modulated carrier received by said matched filter networks.

11. In a telemetry system for communicating data applied to the system in the form of analog voltages, a transmitter comprising: commutator apparatus for periodically sampling the analog voltages; an analog-to-digital converter coupled to said commutator apparatus for respectively producing a plurality of binary coded signals in response to said plurality of voltage samples, the particular binary coded signal produced being determined by the voltage level of the corresponding voltage sample; a Reed-Muller code generator coupled to said analog-to-digital converter and operable in response to said plurality of binary coded signals to produce a corresponding plurality of Reed-Muller coded signals, the particular Reed-Muller coded signal produced being determined by the code of the corresponding binary coded signal; transmitter apparatus including an oscillator for generating a carrier signal and a modulator coupled to said oscillator and said code generator for modulating said carrier signal with said Reed-Muller coded signals, said apparatus transmitting said modulated carrier signal; and means coupled to said commutator apparatus and to said analog-to-digital converter for selectively varying the sampling and binary digit rates, respectively.

12. In a telemetry system wherein analog voltages applied to the system are transmitted as a carrier signal successively modulated by Reed-Muller codes, a receiver comprising: receiver apparatus for receiving the modulated carrier transmitted by said transmitter apparatus; a delay line coupled to said receiver apparatus and having a plurality of taps variably spaced therealong in accordance with the various digit rates to simultaneously produce each coded portion of said modulated carrier; a decoding matrix including a plurality of matched filter networks respectively coupled to said plurality of delay line taps, the filter networks coupled to the taps whereat a modulated portion of the carrier is produced being operable in response thereto to simultaneously produce output signals of varying amplitude, the output signal of maximum amplitude being produced by the filter network whereat a complete match exists between the modulated carrier and the elements of the filter network; a "greatest of" detector connected to said plurality of filter networks, said detector being periodically activated to simultaneously compare the amplitudes of said output signals to identify the matched filter network producing the maximum output signal, said detector identifying said filter network by producing a recognition voltage whose level corresponds to the network identified; a synch generator connected between said matched filter networks and said "greatest of" detector, said synch generator being operable in response to the first output signal of maximum amplitude to periodically generate a synchronizing pulse for activating said detector coincidentally with the occurrence of said output signals; and conversion means connected to said "greatest of" detector and operable in response to each recognition voltage to reproduce the analog voltage associated with the portion of the modulated carrier received by said matched filter networks.

13. In a telemetry system for communicating data applied to the system in the form of analog voltages, a transmitter comprising: a commutator receptive of the analog voltages and operable in response to pulses applied thereto for periodically sampling the analog voltages in rotation; data rate means for generating a train of pulses at a selected pulse repetition rate; a first five-stage binary scaler coupled to said means and operable in response to said train of pulses therefrom to produce five additional trains of pulses at said five stages, respectively, the train of pulses produced by the fifth stage being coupled to said commutator to periodically render it operable; a network connected to the five stages of said binary scaler for summing the trains of pulses therefrom in such a manner as to periodically produce a thirty-two level staircase voltage, each staircase voltage being produced during a voltage sampling period; a comparator circuit coupled to said commutator and to said network for respectively receiving each of said staircase voltages and each of said analog voltage samples, said comparator normally producing a signal at one voltage level and being rendered operable to produce said signal at another voltage level when the level of a staircase voltage first exceeds the amplitude of the corresponding voltage sample, said signal remaining at said other level for the remainder of the sample interval; a flip-flop circuit coupled to the fifth stage of said binary scaler and operable in response to the train of pulses therefrom to simultaneously produce a pair of bi-level complementary output voltages; first and second AND gates coupled to said means and to said comparator and flip-flop circuits, each of said AND gates passing the pulses produced by said means when the comparator signal and the flip-flop output voltage applied thereto are at similar voltage levels, whereby said AND gates pass said pulses alternately; second and third five-stage binary scalers respectively coupled to said first and second AND gates, said second and third scalers alternately being operable in response to the pulses alternately passed by said first and second AND gates to respectively produce five bi-level voltage waveforms, one voltage waveform from each scaler stage; first and second circuits connected between said second and third binary scalers, respectively, and said flip-flop circuit, said second and third circuits respectively being operable in response to said pair of flip-flop output voltages to produce reset pulses for resetting said scalers after they have produced their respective voltage waveforms; Reed-Muller code generating means including a plurality of four one-half adders connected in tandem and a plurality of ten AND gates connected to said flip-flop circuit and coupled between said four one-half adders and said first, second and third binary scalers, said code generator being operable in response to said flip-flop output voltages, to the trains of pulses produced by the last four stages of said first binary scaler, and to the voltage waveforms produced by each of the five stages of said second and third binary scalers to successively produce Reed-Muller coded voltage waveforms respectively representing successive samples taken of the analog voltages; and apparatus including an oscillator for generating a carrier signal and a modulator coupled to said oscillator and said code generator for modulating said carrier signal with said Reed-Muller coded voltage waveforms, said apparatus transmitting said modulated carrier signal.

14. A telemetry system for communicating data applied to the system in the form of analog voltages, said system comprising: a commutator receptive of the analog voltages and operable in response to pulses applied thereto for periodically sampling the analog voltages in rotation; data rate means for generating a train of pulses at a selected pulse repetition rate; a first five-stage binary scaler coupled to said means and operable in response to said train of pulses therefrom to produce five additional trains of pulses at said five stages, respectively, the train of pulses produced by the fifth stage being coupled to said commutator to periodically render it operable; a network connected to the five stages of said binary scaler for summing the trains of pulses therefrom in such a manner as to periodically produce a thirty-two level staircase voltage, each staircase voltage being produced during a voltage sampling period; a comparator circuit coupled to said commutator and to said network for respectively receiving each of said staircase voltages and each of said analog voltage samples, said comparator normally producing a signal at one voltage level and being rendered operable to produce said signal at another voltage level when the level of a staircase voltage first exceeds the amplitude of the corresponding voltage sample, said signal remaining at said other level for the remainder of the sample interval; a flip-flop circuit coupled to the fifth stage of said binary scaler and operable in response to the train of pulses therefrom to simultaneously produce a pair of bi-level complementary output voltages; first and second AND gates coupled to said means and to said comparator and flip-flop circuits, each of said AND gates passing the pulses produced by said means when the comparator signal and the flip-flop output voltage applied thereto are at similar voltage levels, whereby said AND gates pass said pulses alternately; second and third five-stage binary scalers respectively coupled to said first and second AND gates, said second and third scalers alternately being operable in response to the pulses alternately passed by said first and second AND gates to respectively produce five bi-level voltage waveforms, one voltage waveform from each scaler stage; first and second circuits connected between said second and third binary scalers, respectively, and said flip-flop circuits, said second and third circuits respectively being operable in response to said pair of flip-flop output voltages to produce reset pulses for resetting said scalers after they have produced their respective voltage waveforms; Reed-Muller code generating means including a plurality of four one-half adders connected in tandem and a plurality of ten AND gates connected to said flip-flop circuit and coupled between said four one-half adders and said first, second and third binary scalers, said code generator being operable in response to said flip-flop output voltages, to the trains of pulses produced by the last four stages of said first binary scaler, and to the voltage waveforms produced by each of the five stages of said second and third binary scalers to successively produce Reed-Muller coded voltage waveforms respectively representing successive samples taken of the analog voltages; apparatus including an oscillator for generating a carrier signal and a modulator coupled to said oscillator and said code generator for modulating said carrier signal with said Reed-Muller coded voltage waveforms, said apparatus transmitting said modulated carrier signal; means for receiving the modulated carrier; a plurality of correlation detectors coupled to said means in such a manner as to simultaneously receive each code modulated portion of the carrier, said plurality of detectors being operable in response to each such carrier portion to simultaneously produce a corresponding plurality of output signals of varying amplitude, the detector whereat there is complete carrier signal correlation producing the output signal of maximum amplitude; and output means coupled to said correlation detectors for simultaneously comparing the amplitudes of said output signals to identify the detector producing the maximum output signal, said output means including additional means for reproducing the analog signal corresponding to the modulation on the portion of the carrier received by said correlation detectors.

15. A telemetry system for communicating data applied to the system in the form of analog voltages, said system comprising: a commutator receptive of the analog voltages and operable in response to pulses applied thereto for periodically sampling the analog voltages in rotation; data rate means for generating a train of pulses at a selected pulse repetition rate; a first five-stage binary scaler coupled to said means and operable in response to said train of pulses therefrom to produce five additional trains of pulses at said five stages, respectively, the train of pulses produced by the fifth stage being coupled to said commutator to periodically render it operable; a network connected to the five stages of said binary scaler for summing the trains of pulses therefrom in such a manner as to periodically produce a thirty-two level staircase voltage, each staircase voltage being produced during a voltage sampling period; a comparator circuit coupled to said commutator and to said network for respectively receiving each of said staircase voltages and each of said analog voltage samples, said comparator normally producing a signal at one voltage level and being rendered operable to produce said signal at another voltage level when the level of a staircase voltage first exceeds the amplitude of the corresponding voltage sample, said signal remaining at said other level for the remainder of the sample interval; a flip-flop circuit coupled to the fifth stage of said binary scaler and operable in response to the train of pulses therefrom to simultaneously produce a pair of bi-level complementary output voltages; first and second AND gates coupled to said means and to said comparator and flip-flop circuits, each of said AND gates passing the pulses produced by said means when the comparator signal and the flip-flop output voltage applied thereto are at similar voltage levels, whereby said AND gates pass said pulses alternately; second and third five-stage binary scalers respectively coupled to said first and second AND gates, said second and third scalers alternately being operable in response to the pulses alternately passed by said first and second AND gates to respectively produce five bi-level voltage waveforms, one voltage waveform from each scaler stage; first and second circuits connected between said second and third binary scalers, respectively, and said flip-flop circuit, said second and third circuits respectively being operable in response to said pair of flip-flop output voltages to produce reset pulses for resetting said scalers after they have produced their respective voltage waveforms; Reed-Muller code generating means including a plurality of four one-half adders connected in tandem and a plurality of ten AND gates connected to said flip-flop circuit and coupled between said four one-half adders and said first, second and third binary scalers, said code generator being operable in response to said flip-flop output voltages, to the trains of pulses produced by the last four stages of said first binary scaler, and to the voltage waveforms produced by each of the five stages of said second and third binary scalers to successively produce Reed-Muller coded voltage waveforms respectively representing successive samples taken of the analog voltages; apparatus including an oscillator for generating a carrier signal and a modulator coupled to said oscillator and said code generator for modulating said carrier signal with said Reed-Muller coded voltage waveforms, said apparatus transmitting said modulated carrier signal; means for receiving the modulated carrier; a delay line coupled to said means having a plurality of taps variably spaced therealong in correspondence with the various digit rates to simultaneously produce each coded portion of the modulated carrier; a decoding matrix including a plurality of matched filter networks respectively coupled to said plurality of delay line taps, the filter networks coupled to the taps whereat a portion of the carrier is produced being operable in response thereto to respectively produce output signals of varying amplitude, the output signal of maximum amplitude being produced by the filter network whereat a complete match exists between the modulated carrier and the elements of the filter network; and output means coupled to said decoding matrix for simultaneously comparing the amplitudes of said output signals to identify the filter network producing the maximum output signal, said output means including additional means for reproducing the analog signal corresponding to the modulation on the portion of the carrier applied to said matched filter networks.

16. A telemetry system for communicating data applied to the system in the form of analog voltages, said system comprising: a commutator receptive of the analog voltages and operable in response to pulses applied thereto for periodically sampling the analog voltages in rotation; data rate means for generating a train of pulses at a selected pulse repetition rate; a first five-stage binary scaler coupled to said means and operable in response to said train of pulses therefrom to produce five additional trains of pulses at said five stages, respectively, the train of pulses produced by the fifth stage being coupled to said commutator to periodically render it operable; a network connected to the five stages of said binary scaler for summing the trains of pulses therefrom in such a manner as to periodically produce a thirty-two level staircase voltage, each staircase voltage being produced during a voltage sampling period; a comparator circuit coupled to said commutator and to said network for respectively receiving each of said staircase voltages and each of said analog voltage samples, said comparator normally producing a signal at one voltage level and being rendered operable to produce said signal at another voltage level when the level of a staircase voltage first exceeds the amplitude of the corresponding voltage sample, said signal remaining at said other level for the remainder of the sample interval; a flip-flop circuit coupled to the fifth stage of said binary scaler and operable in response to the train of pulses therefrom to simultaneously produce a pair of bi-level complementary output voltages; first and second AND gates coupled to said means and to said comparator and flip-flop circuits, each of said AND gates passing the pulses produced by said means when the comparator signal and the flip-flop output voltage applied thereto are at similar voltage levels, whereby said AND gates pass said pulses alternately; second and third five-stage binary scalers respectively coupled to said first and second AND gates, said second and third scalers alternately being operable in response to the pulses alternately passed by said first and second AND gates to respectively produce five bi-level voltage waveforms, one voltage waveform from each scaler stage; first and second circuits connected between said second and third binary scalers, respectively, and said flip-flop circuit, said second and third circuits respectively being operable in response to said pair of flip-flop output voltages to produce reset pulses for resetting said scalers after they have produced their respective voltage waveforms; Reed-Muller code generating means including a plurality of four one-half adders connected in tandem and a plurality of ten AND gates connected to said flip-flop circuit and coupled between said four one-half adders and said first, second and third binary scalers, said code generator being operable in response to said flip-flop output voltages, to the trains of pulses produced by the last four stages of said first binary scaler, and to the voltage waveforms produced by each of the five stages of said second and third binary scalers to successively produce Reed-Muller coded voltage waveforms respectively representing successive samples taken of the analog voltages; apparatus including an oscillator for generating a carrier signal and a modulator coupled to said oscillator and said code generator for modulating said carrier signal with said Reed-Muller coded voltage waveforms, said apparatus transmitting said modulated carrier signal; means for receiving said modulated carrier; a plurality of correlation detectors coupled to said last-named means in such a manner as to simultaneously receive each code modulated portion of said carrier, said plurality of detectors being operable in response to each such carrier portion to simultaneously produce a corresponding plurality of output signals of varying amplitude, the output signal of maximum amplitude being produced by the one detector whereat complete carrier signal correlation exists; a "greatest of" detector connected to said plurality of correlation detectors, said "greatest of" detector being periodically activated to simultaneously compare the amplitudes of said output signals to identify the correlation detector producing the maximum output signal, said "greatest of" detector identifying said correlation detector by producing a recognition voltage at a level corresponding to the detector identified; a synch generator connected between said correlation detectors and said "greatest of" detector, said synch generator being operable in response to the first output signal of maximum amplitude to periodically generate a synchronizing pulse for activating said "greatest of" detector coincidentally with the occurrence of said output signals; and output means connected to said "greatest of" detector and operable in response to each recognition voltage to reproduce the analog signal associated with the portion of the modulated carrier received by said correlation detectors.

17. A telemetry system for communicating data applied to the system in the form of analog voltages, said system comprising: a commutator receptive of the analog voltages and operable in response to pulses applied thereto for periodically sampling the analog voltages in rotation; data rate means for generating a train of pulses at a selected pulse repetition rate; a first five-stage binary scaler coupled to said means and operable in response to said train of pulses therefrom to produce five additional trains of pulses at said five stages, respectively, the train of pulses produced by the fifth stage being coupled to said commutator to periodically render it operable; a network connected to the five stages of said binary scaler for summing the trains of pulses therefrom in such a manner as to periodically produce a thirty-two level staircase voltage, each staircase voltage being produced during a voltage sampling period; a comparator circuit coupled to said commutator and to said network for respectively receiving each of said staircase voltages and each of said analog voltage samples, said comparator normally producing a signal at one voltage level and being rendered operable to produce said signal at another voltage level when the level of a staircase voltage first exceeds the amplitude of the corresponding voltage sample, said signal remaining at said other level for the remainder of the sample interval; a flip-flop circuit coupled to the fifth stage of said binary scaler and operable in response to the train of pulses therefrom to simultaneously produce a pair of bi-level complementary output voltages; first and second AND gates coupled to said means and to said comparator and flip-flop circuits, each of said AND gates passing the pulses produced by said means when the comparator signal and the flip-flop output voltage applied thereto are at similar voltage levels, whereby said AND gates pass said pulses alternately; second and third five-stage binary scalers respectively coupled to said first and second AND gates, said second and third scalers alternately being operable in response to the pulses alternately passed by said first and second AND gates to respectively produce five bi-level voltage waveforms, one voltage waveform from each scaler stage; first and second circuits connected between said second and third binary scalers, respectively, and said flip-flop circuit, said second and third circuits respectively being operable in response to said pair of flip-flop output voltages to produce reset pulses for resetting said scalers after they have produced their respective voltage waveforms; Reed-Muller code generating means including a plurality of four one-half adders connected in tandem and a plurality of ten AND gates connected to said flip-flop circuit and coupled between said four one-half adders and said first, second and third binary scalers, said code generator being operable in response to said flip-flop output voltages, to the trains of pulses produced by the last four stages of said first binary scaler, and to the voltage waveforms produced by each of the five stages of said second and third binary scalers to successively produce Reed-Muller coded voltage waveforms respectively representing successive samples taken of the analog voltages; apparatus including an oscillator for generating a carrier signal and a modulator coupled to said oscillator and said code generator for modulating said carrier signal with said Reed-Muller coded voltage waveforms, said apparatus transmitting said modulated carrier signal; receiver apparatus for receiving the modulated carrier transmitted by said apparatus; a delay line coupled to said receiver apparatus and having a plurality of taps variably spaced therealong in accordance with the various digit rates to simultaneously produce each coded portion of said modulated carrier; a decoding matrix including a plurality of matched filter networks respectively coupled to said plurality of delay line taps, the filter networks coupled to the taps whereat a modulated portion of the carrier is produced being operable in response thereto to simultaneously produce output signals of varying amplitude, the output signal of maximum amplitude being produced by the filter network whereat a complete match exists between the modulated carrier and the elements of the filter network; a "greatest of" detector connected to said plurality of filter networks, said detector being periodically activated to simultaneously compare the amplitudes of said output signals to identify the matched filter network producing the maximum output signal, said detector identifying said filter network by producing a recognition voltage whose level corresponds to the network identified; a synch generator connected between said matched filter networks and said "greatest of" detector, said synch generator being operable in response to the first output signal of maximum amplitude to periodically generate a synchronizing pulse for activating said detector coincidentally with the occurrence of said output signals; and conversion means connected to said "greatest of" detector and operable in response to each recognition voltage to reproduce the analog voltage associated with the portion of the modulated carrier received by said matched filter networks.

18. A telemetry system for communicating data previously represented by a plurality of binary coded signals; said system comprising: a Reed-Muller code generator receptive of the plurality of binary coded signals and operable in response thereto to produce a corresponding plurality of Reed-Muller coded signals, the particular Reed-Muller coded signal produced being determined by the digitalization pattern of the corresponding binary coded signal; transmitter apparatus including an oscillator for generating a carrier signal and a modulator coupled to said oscillator and said code generator for modulating said carrier signal with said Reed-Muller coded signals, said apparatus transmitting said modulated carrier signal; receiver apparatus for receiving the modulated carrier transmitted by said transmitter apparatus; a delay line coupled to said receiver apparatus and having a plurality of taps variably spaced therealong in accordance with the various digit rates to simultaneously produce each coded portion of said modulated carrier; a decoding matrix including a plurality of matched filter networks respectively coupled to said plurality of delay line taps, the filter networks coupled to the taps whereat a modulated portion of the carrier is produced being operable in response thereto to simultaneously produce output signals of varying amplitude, the output signal of maximum amplitude being produced by the filter network whereat a complete match exists between the modulated carrier and the elements of the filter network; a "greatest of" detector connected to said plurality of filter networks, said detector being periodically activated to simultaneously compare the amplitudes of said output signals to identify the matched filter network producing the maximum output signal, said detector identifying said filter network by producing a recognition voltage whose level corresponds to the network identified; a synch generator connected between said matched filter networks and said "greatest of" detector, said synch generator being operable in response to the first output signal of maximum amplitude to periodically generate a synchronizing pulse for activating said detector coincidentally with the occurrence of said output signals, and conversion means connected to said "greatest of" detector and operable in response to each recognition voltage to reproduce the datum signal associated with the portion of the modulated carrier received by said matched filter networks.

19. In a telemetry system wherein data is transmitted at a selected rate as modulation on a carrier, the modulating signal being a bi-level voltage varying between the two levels according to a predetermined coding scheme, a receiver subsystem comprising: a phase-locked receiver for searching and locking on the modulated carrier, said receiver being operable to reproduce the modulating signal therefrom; generator means for generating a local carrier signal; a balanced modulator connected between said generator means and said phase locked receiver and operable in response to the signals received therefrom to produce a phase-modulated carrier that is of a first phase relative to said local carrier when the modulating signal is at one voltage level and of a second phase relative to said local carrier when the modulating signal is at the other voltage level; a delay line coupled to said balanced modulator and having a plurality of taps variably spaced therealong in accordance with available data rates to simultaneously produce each coded portion of said phase-modulated carrier; a matrix of matched filters including a plurality of first lines respectively connected to said plurality of delay line taps, a plurality of second lines, one pair of second lines for at least each filter, and a plurality of resistors interconnecting said first and second lines in such a manner that the filters coupled to the taps whereat a modulated portion of said phase-modulated carrier is simultaneously produced are operable in response thereto to simultaneously produce output signals at said second lines of varying amplitude and respectively having one of said first and second phases, each filter respectively producing a pair of output signals at the associated pair of second lines, one signal having said first phase and the other signal having said second phase, the pair of output signals of maximum amplitude being produced by the filter whereat all the segments of the simultaneously produced carrier having said first phase are applied through said filter resistors to one of the associated pair of second lines and all the segments of the carrier having said second phase are applied through said filler resistors to the other of the associated pair of second lines; a plurality of difference amplifiers connected to said second lines, one difference amplifier being connected to each pair, said amplifiers producing difference signals of varying amplitude and having said first phase, the difference signal of maximum amplitude being produced by the amplifier connected to the filter producing the maximum output signals; sources of first and second continuous-wave signals having said first and second phases, respectively; a pair of phase detectors connected to each difference amplifier for receiving the difference signal therefrom, one detector in each pair being additionally connected to said sources so as to receive said first continuous-wave signal and the other detector in each pair being additionally connected to said sources so as to receive said second continuous-wave signal, said detectors being operable in response to said difference and continuous-wave signals to produce pulses of varying amplitude, the pulse of maximum amplitude being produced by the phase detector receiving the difference signal of maximum amplitude; a "greatest of" detector connected to said phase detectors and periodically activated to simultaneously compare the amplitudes of said pulses to identify the phase detector producing the pulse of maximum amplitude, said "greatest of" detector identifying said phase detector by producing a recognition voltage at a level corresponding to the detector identified; synchronizing means for periodically activating said "greatest of" detector coincidentally with the occurrence of said pulses; and output means coupled to said "greatest of" detector and operable in response to each recognition voltage to reproduce the data associated with the portion of the modulated carrier received by said matched filters.

20. A telemetry system for communicating data applied to the system in the form of analog voltages, said system comprising: first means for periodically sampling the analog voltages; second means coupled to said first means and operable in response to the plurality of voltage samples received therefrom to produce a corresponding plurality of digitalized signals coded in accordance with the Reed-Muller codes to respectively represent said samples, the code selected for each digitalized signal being determined by the amplitude of the corresponding voltage sample, said second means including additional means for comparing each voltage sample with a predetermined number of different voltage levels to determine the amplitude of each sample; third means having an oscillator therein for generating a carrier signal, said third means being coupled to said second means to receive said coded digitalized signals therefrom, said third means including further means for transmitting said carrier signal modulated by said coded digitalized signals; a phase-locked receiver for searching and locking on the modulated carrier, said receiver being operable to reproduce the modulating signal therefrom; generator means for generating a local carrier signal; a balanced modulator connected between said generator means and said phase locked receiver and operable in response to the signals received therefrom to produce a phase-modulated carrier that is of a first phase relative to said local carrier when the modulating signal is at one voltage level and of a second phase relative to said local carrier when the modulating signal is at the other voltage level; a delay line coupled to said balanced modulator and having a plurality of taps variably spaced therealong in accordance with available data rates to simultaneously produce each coded portion of said phase-modulated carrier; a matrix of matched filters including a plurality of first lines respectively connected to said plurality of delay line taps, a plurality of second lines, one pair of second lines for at least each filter, and a plurality of resistors interconnecting said first and second lines in such a manner that the filters coupled to the taps whereat a modulated portion of said phase-modulated carrier is simultaneously produced are operable in response thereto to simultaneously produce output signals at said second lines of varying amplitude and respectively having one of said first and second phases, each filter respectively producing a pair of output signals at the associated pair of second lines, one signal having said first phase and the other signal having said second phase, the pair of output signals of maximum amplitude being produced by the filter whereat all the segments of the simultaneously produced carrier having said first phase are applied through said filter resistors to one of the associated pair of second lines and all the segments of the carrier having said second phase are applied through said filter resistors to the other of the associated pair of second lines; a plurality of difference amplifiers connected to said second lines, one difference amplifier being connected to each pair, said amplifiers producing difference signals of varying amplitude and having said first phase, the difference signal of maximum amplitude being produced by the amplifier connected to the filter producing the maximum output signals; sources of first and second continuous-wave signals having said first and second continuous-wave signals having said first and second phases, respectively; a pair of phase detectors connected to each difference amplifier for receiving the difference signal therefrom, one detector in each pair being additionally connected to said sources so as to receive said first continuous-wave signal and the other detector in each pair being additionally connected to said sources so as to receive said second continuous-wave signal, said detectors being operable in response to said difference and continuous-wave signals to produce pulses of varying amplitude, the pulse of maximum amplitude being produced by the phase detector receiving the difference signal of maximum amplitude; a "greatest of" detector connected to said phase detectors and periodically activated to simultaneously compare the amplitudes of said pulses to identify the phase detector producing the pulse of maximum amplitude, said "greatest of" detector identifying said phase detector by producing a recognition voltage at a level corresponding to the detector identified; synchronizing means for periodically activating said "greatest of" detector coincidentally with the occurrence of said pulses; and output means coupled to said "greatest of" detector and operable in response to each recognition voltage to reproduce the data associated with the portion of the modulated carrier received by said matched filters.

21. A telemetry system for communicating data applied to the system in the form of analog voltages, said system comprising: first means for periodically sampling the analog voltages; second means coupled to said first means and operable in response to the plurality of voltage samples received therefrom to produce a corresponding plurality of binary coded signals coded in accordance with the Reed-Muller codes to respectively represent said samples; third means coupled to said first and second means for selectively varying the sampling rate and the binary digit rate, respectively; transmitter apparatus coupled to said second means for transmitting a carrier signal successively modulated by said plurality of binary coded signals; a phase-locked receiver for searching and locking on the modulated carrier, said receiver being operable to reproduce the modulating signal therefrom; generator means for generating a local carrier signal; a balanced modulator connected between said generator means and said phase locked receiver and operable in response to the signals received therefrom to produce a phase-modulated carrier that is of a first phase relative to said local carrier when the modulating signal is at one voltage level and of a second phase relative to said local carrier when the modulating signal is at the other voltage level; a delay line coupled to said balanced modulator and having a plurality of taps variably spaced therealong in accordance with available data rates to simultaneously produce each coded portion of said phase-modulated carrier; a matrix of matched filters including a plurality of first lines respectively connected to said plurality of delay line taps, a plurality of second lines, one pair of second lines for at least each filter, and a plurality of resistors interconnecting said first and second lines in such a manner that the filters coupled to the taps whereat a modulated portion of said phase-modulated carrier is simultaneously produced are operable in response thereto to simultaneously produce output signals at said second lines of varying amplitude and respectively having one of said first and second phases, each filter respectively producing a pair of output signals at the associated pair of second lines, one signal having said first phase and the other signal having said second phase, the pair of output signals of maximum amplitude being produced by the filter whereat all the segments of the simultaneously produced carrier having said first phase are applied through said filter resistors to one of the associated pair of second lines and all of the segments of the carrier having said second phase are applied through said filter resistors to the other of the associated pair of second lines; a plurality of difference amplifiers connected to said second lines, one difference amplifier being connected to each pair, said amplifiers producing difference signals of varying amplitude and having said first phase, the difference signal of maximum amplitude being produced by the amplifier connected to the filter producing the maximum output signals; sources of first and second continuous-wave signals having said first and second phases, respectively; a pair of phase detectors connected to each difference amplifier for receiving the difference signal therefrom, one detector in each pair being additionally connected to said sources so as to receive said first continuous-wave signal and the other detector in each pair being additionally connected to said difference and continuous-wave signals to produce pulses of varying amplitude, the pulse of maximum amplitude being produced by the phase detector receiving the difference signal of maximum amplitude; a "greatest of" detector connected to said phase detectors and periodically activated to simultaneously compare the amplitudes of said pulses to identify the phase detector producing the pulse of maximum amplitude, said "greatest of" detector identifying said phase detector by producing a recognition voltage at a level corresponding to the detector identified; synchronizing means for periodically activating said "greatest of" detector coincidentally with the occurrence of said pulses; and output means coupled to said "greatest of" detector and operable in response to each recognition voltage to reproduce the data associated with the portion of the modulated carrier received by said matched filters.

22. A telemetry system for communicating data applied to the system in the form of analog voltages, said system comprising: means for periodically sampling the analog voltages; an analog-to-digital converter coupled to said means for quantizing each voltage sample according to the amplitude thereof; a Reed-Muller code generator coupled to said analog-to-digital converter and operable in response to each quantized signal therefrom to generate a Reed-Muller code corresponding to the applied quantized signal; a transmitter apparatus including an oscillator for generating a carrier signal and a modulator coupled to said oscillator and said code generator for modulating said carrier signal with said Reed-Muller codes, said apparatus transmitting said modulated carrier signal; a phase-locked receiver for searching and locking on the modulated carrier, said receiver being operable to reproduce the modulating signal therefrom; generator means for generating a local carrier signal; a balanced modulator connected between said generator means and said phase locked receiver and operable in response to the signals received therefrom to produce a phase-modulated carrier that is of a first phase relative to said local carrier when the modulating signal is at one voltage level and of a second phase relative to said local carrier when the modulating signal is at the other voltage level; a delay line coupled to said balanced modulator and having a plurality of taps variably spaced therealong in accordance with available data rates to simultaneously produce each coded portion of said phase-modulated carrier; a matrix of matched filters including a plurality of first lines respectively connected to said plurality of delay line taps, a plurality of second lines, one pair of second lines for at least each filter, and a plurality of resistors interconnecting said first and second lines in such a manner that the filters coupled to the taps whereat a modulated portion of said phase-modulated carrier is simultaneously produced are operable in response thereto to simultaneously produce output signals at said second lines of varying amplitude and respectively having one of said first and second phases, each filter respectively producing a pair of output signals at the associated pair of second lines, one signal having said first phase and the other signal having said second phase, the pair of output signals of maximum amplitude being produced by the filter whereat all the segments of the simultaneously produced carrier having said first phase are applied through said filter resistors to one of the associated pair of second lines and all the segments of the carrier having said second phase are applied through said filter resistors to the other of the associated pair of second lines; a plurality of difference amplifiers connected to said second lines, one difference amplifier being connected to each pair, said amplifiers producing difference signals of varying amplitude and having said first phase, the difference signal of maximum amplitude being produced by the amplifier connected to the filter producing the maximum output signals; sources of first and second continuous-wave signals having said first and second phases, respectively; a pair of phase detectors connected to each difference amplifier for receiving the difference signal therefrom, one detector in each pair being additionally connected to said sources so as to receive said first continuous-wave signal and the other detector in each pair being additionally connected to said sources so as to receive said second continuous-wave signal, said detectors being operable in response to said difference and continuous-wave signals to produce pulses of varying amplitude, the pulse of maximum amplitude being produced by the phase detector receiving the difference signal of maximum amplitude; a "greatest of" detector connected to said phase detectors and periodically activated to simultaneously compare the amplitudes of said pulses to identify the phase detector producing the pulse of maximum amplitude, said "greatest of" detector identifying said phase detector by producing a recognition voltage at a level corresponding to the detector identified; synchronizing means for periodically activating said "greatest of" detector coincidentally with the occurrence of said pulses; and output means coupled to said "greatest of" detector and operable in response to each recognition voltage to reproduce the data associated with the portion of the modulated carrier received by said matched filters.

23. A telemetry system for communicating data applied to the system in the form of analog voltages, said system comprising: commutator apparatus for periodically sampling the analog voltages; an analog-to-digital converter coupled to said commutator apparatus for respectively producing a plurality of binary coded signals in response to said plurality of voltage samples, the particularly binary coded signal produced being determined by the voltage level of the corresponding voltage sample; a Reed-Muller code generator coupled to said analog-to-digital converter and operable in response to said plurality of binary coded signals to produce a corresponding plurality of Reed-Muller coded signals, the particular Reed-Muller coded signal produced being determined by the code of the corresponding binary coded signal; transmitter apparatus including an oscillator for generating a carrier signal and a modulator coupled to said oscillator and said code generator for modulating said carrier signal with said Reed-Muller coded signals, said apparatus transmitting said modulated carrier signal; means coupled to said commutator apparatus and to said analog-to-digital converter for selectively varying the sampling and binary digit rates, respectively; a phase-locked receiver for searching and locking on the modulated carrier, said receiver being operable to reproduce the modulating signal therefrom; generator means for generating a local carrier signal; a balanced modulator connected between said generator means and said phase locked receiver and operable in response to the signals received therefrom to produce a phase-modulated carrier that is of a first phase relative to said local carrier when the modulating signal is at one voltage level and of a second phase relative to said local carrier when the modulating signal is at the other voltage level; a delay line coupled to said balanced modulator and having a plurality of taps variably spaced therealong in accordance with available data rates to simultaneously produce each coded portion of said phase-modulated carrier; a matrix of matched filters including a plurality of first lines respectively connected to said plurality of delay line taps, a plurality of second lines, one pair of second lines for at least each filter, and a plurality of resistors interconnecting said first and second lines in such a manner that the filters coupled to the taps whereat a modulated portion of said phase-modulated carrier is simultaneously produced are operable in response thereto simultaneously produce output signls at said second lines of varying amplitude and respectively having one of said first and second phases, each filter respectively producing a pair of output signals at the associated pair of second lines, one signal having said first phase and the other signal having said second phase, the pair of output signals of maximum amplitude being produced by the filter whereat all the segments of the simultaneously produced carrier having said first phase are applied through said filter resistors to one of the associated pair of second lines and all the segments of the carrier having said second phase are applied through said filter resistors to the other of the associated pair of second lines; a plurality of difference amplifiers connected to said second lines, one difference amplifier being connected to each pair, said amplifiers producing difference signals of varying amplitude and having said first phase, the difference signal of maximum amplitude being produced by the amplifier connected to the filter producing the maximum output signals; sources of first and second continuous-wave signals having said first and second phases, respectively; a pair of phase detectors connected to each difference amplifier for receiving the difference signal therefrom, one detector in each pair being additionally connected to said sources so as to receive said first continuous-wave signal and the other detector in each pair being additionally connected to said sources so as to receive said second continuous-wave signal, said detectors being operable in response to said difference and continuous-wave signals to produce pulses of varying amplitude, the pulse of maximum amplitude being produced by the phase detector receiving the difference signal of maximum amplitude; a "greatest of" detector connected to said phase detectors and periodically activated to simultaneously compare the amplitudes of said pulses to identify the phase detector producing the pulse of maximum amplitude, said "greatest of" detector identifying said phase detector by producing a recognition voltage at a level corresponding to the detector identified; synchronizing means for periodically activating said "greatest of" detector coincidentally with the occurrence of said pulses; and output means coupled to said "greatest of" detector and operable in response to each recognition voltage to reproduce the data associated with the portion of the modulated carrier received by said matched filters.

24. A telemetry system for communicating data applied to the system in the form of analog voltages, said system comprising: a commutator receptive of the analog voltages and operable in response to pulses applied thereto for periodically sampling the analog voltages in rotation; data rate means for generating a train of pulses at a selected pulse repetition rate; a first five-stage binary scaler coupled to said means and operable in response to said train of pulses therefrom to produce five additional trains of pulses at said five stages, respectively, the train of pulses produced by the fifth stage being coupled to said commutator to periodically render it operable; a network connected to the five stages of said binary scaler for summing the trains of pulses therefrom in such a manner as to periodically produce a thirty-two level staircase voltage, each staircase voltage being produced during a voltage sampling period; a comparator circuit to said commutator and to said network for respectively each of said staircase voltages and each of said analog voltage samples, said comparator normally producing a signal at one voltage level and being rendered operable to produce said signal at another voltage level when the level of a staircase voltage first exceeds the amplitude of the corresponding voltage sample, said signal remaining at said other level for the remainder of the sample interval; a flip-flop circuit coupled to the fifth stage of said binary scaler and operable in response to the train of pulses therefrom to simultaneously produce a pair of bi-level complementary output voltages; first and second AND gates coupled to said means and to said comparator and flip-flop circuits, each of said AND gates passing the pulses produced by said means when the comparator signal and the flip-flop output voltage applied thereto are at similar voltage levels, whereby said AND gates pass said pulses alternately; second and third five-stage binary scalers respectively coupled to said first and second AND gates, said second and third scalers alternately being operable in response to the pulses alternately passed by said first and second AND gates to respectively produce five bi-level voltage waveforms, one voltage waveform from each scaler stage; first and second circuits connected between said second and third binary scalers, respectively, and said flip-flop circuit, said second and third circuits respectively being operable in response to said pair of flip-flop output voltages to produce reset pulses for resetting said scalers after they have produced their respective voltage waveforms; Reed-Muller code generating means including a plurality of four one-half adders connected in tandem and a plurality of ten AND gates connected to said flip-flop circuit and coupled between said four one-half adders and said first, second and third binary scalers, said code generator being operable in response to said flip-flop output voltages, to the trains of pulses produced by the last four stages of said first binary scaler, and to the voltage waveforms produced by each of the five stages of said second and third binary scalers to successively produce Reed-Muller coded voltage waveforms respectively representing successive samples taken of the analog voltages; apparatus including an oscillator for generating a carrier signal and a modulator coupled to said oscillator and said code generator for modulating said carrier signal with said Reed-Muller coded voltage waveforms, said apparatus transmitting said modulated carrier signal; a phase-locked receiver for searching and locking on the modulated carrier, said receiver being operable to reproduce the modulating signal therefrom; generator means for generating a local carrier signal; a balanced modulator connected between said generator means and said phase locked receiver and operable in response to the signals received therefrom to produce a phase-modulated carrier that is of a first phase relative to said local carrier when the modulating signal is at one voltage level and of a second phase relative to said local carrier when the modulating signal is at the other voltage level; a delay line coupled to said balanced modulator and having a plurality of taps variably spaced therealong in accordance with available data rates to simultaneously produce each coded portion of said phase-modulated carrier; a matrix of matched filters including a plurality of first lines respectively connected to said plurality of delay line taps, a plurality of second lines, one pair of second lines for at least each filter, and a plurality of resistors interconnecting said first and second lines in such a manner that the filters coupled to the taps whereat a modulated portion of said phase-modulated carrier is simultaneously produced are operable in response thereto to simultaneously produce output signals at said second lines of varying amplitude and respectively having one of said first and second phases, each filter respectively producing a pair of output signals at the associated pair of second lines, one signal having said first phase and the other signal having said second phase, the pair of output signals of maximum amplitude being produced by the filter whereat all the segments of the simultaneously produced carrier having said first phase are applied through said filter resistors to one of the associated pair of second lines and all the segments of the carrier having said second phase are applied through said filter resistors to the other of the associated pair of second lines; a plurality of difference amplifiers connected to said second lines, one difference amplifier being connected to each pair, said amplifiers producing difference signals of varying amplitude and having said first phase, the difference signal of maximum amplitude being produced by the amplifier connected to the filter producing the maximum output signals; sources of first and second continuous-wave signals having said first and second phases, respectively; a pair of phase detectors connected to each difference amplifier for receiving the difference signal therefrom, one detector in each pair being additionally connected to said sources so as to receive said first continuous-wave signal and the other detector in each pair being additionally connected to said sources so as to receive said second continuous-wave signal, said detectors being operable in response to said difference and continuous-wave signals to produce pulses of varying amplitude, the pulse of maximum amplitude being produced by the phase detector receiving the difference signal of maximum amplitude; a "greatest of" detector connected to said phase detectors and periodically activated to simultaneously compare the amplitudes of said pulses to identify the phase detector producing the pulse of maximum amplitude, said "greatest of" detector identifying said phase detector by producing a recognition voltage at a level corresponding to the detector identified; synchronizing means for periodically activating said "greatest of" detector coincidentally with the occurrence of said pulses; and output means coupled to said "greatest of" detector and operable in response to each recognition voltage to reproduce the data associated with the portion of the modulated carrier received by said matched filters.

25. A telemetry system for communicating data previously represented by digitalized signals, said system comprising: code generator means receptive of the digitalized signals and operable in response thereto to produce corresponding binary coded signals, the particular binary coded signal produced being determined by the particular digitalization pattern of the digitalized signals; data rate means for selectively varying the digit rate of the digitalized signals, thereby to selectively vary the digit rate of the corresponding binary coded signals; transmitter apparatus including an oscillator for generating a carrier signal and a modulator coupled to said oscillator and said code generator means for modulating said carrier with said binary coded signals, said apparatus transmitting said modulated carrier signal; a phase-locked receiver for searching for and locking on to said modulated carrier; a delay line coupled to said receiver and having a plurality of taps variably spaced therealong in accordance with the various digit rates in order to simultaneously produce each binary coded portion of said modulated carrier; a plurality of matched filter networks respectively coupled to said plurality of delay line taps, the filter networks coupled to the taps whereat a modulated portion of the carrier is produced being operable in response thereto to simultaneously produce output signals of varying amplitude, the output signal of maximum amplitude being produced by the filter network whereat a complete match exists between the modulated carrier and the elements of the filter network; a "greatest of" detector connected to said plurality of filter networks, said detector being periodically activated to simultaneously compare the amplitudes of said output signals to identify the matched filter network producing the maximum output signal, said detector identifying said filter network by producing a recognition voltage whose level corresponds to the network identified; a synch generator connected between said matched filter networks and said "greatest of" detector, said synch generator being operable in response to the first output signal of maximum amplitude to periodically generate a synchronizing pulse for activating said detector coincidentally with the occurrence of said output signals, and conversion means connected to said "greatest of" detector and operable in response to each recognition voltage to reproduce the datum signal associated with the portion of the modulated carrier received by said matched filter networks.

References Cited in the file of this patent

UNITED STATES PATENTS

| | | |
|---|---|---|
| 2,720,557 | Goodall | Oct. 11, 1955 |
| 2,733,432 | Breckman | Jan. 31, 1956 |
| 2,738,504 | Gray | Mar. 13, 1956 |
| 2,801,281 | Oliver | July 30, 1957 |
| 2,835,805 | Posthumus | May 20, 1958 |
| 2,839,740 | Haanstra | June 17, 1958 |
| 2,901,602 | Younker | Aug. 25, 1959 |